United States Patent
Wang et al.

(10) Patent No.: US 10,796,189 B2
(45) Date of Patent: Oct. 6, 2020

(54) AUTOMATED SYSTEM AND METHODOLOGY FOR FEATURE EXTRACTION

(71) Applicant: Pictometry International Corp., Rochester, NY (US)

(72) Inventors: Yandong Wang, Webster, NY (US); Frank Giuffrida, Honeoye Falls, NY (US)

(73) Assignee: Pictometry International Corp., Rochester, NY (US)

(*) Notice: Subject to any disclaimer, the term of this patent is extended or adjusted under 35 U.S.C. 154(b) by 0 days.

(21) Appl. No.: 16/548,219

(22) Filed: Aug. 22, 2019

(65) Prior Publication Data

US 2019/0377966 A1 Dec. 12, 2019

Related U.S. Application Data

(62) Division of application No. 15/428,860, filed on Feb. 9, 2017, now Pat. No. 10,402,676.

(Continued)

(51) Int. Cl.
*G06K 9/46* (2006.01)
*G06K 9/00* (2006.01)
(Continued)

(52) U.S. Cl.
CPC ....... *G06K 9/4604* (2013.01); *G06K 9/00201* (2013.01); *G06K 9/00536* (2013.01);
(Continued)

(58) Field of Classification Search
CPC . G06T 2207/10028; G06T 7/521; G06T 7/50; G06T 7/73; G06K 9/4604;
(Continued)

(56) References Cited

U.S. PATENT DOCUMENTS 2,273,876 A 2/1942 Lutz et al.
3,153,784 A 10/1964 Petrides et al.
(Continued)

FOREIGN PATENT DOCUMENTS

AT 331204 T 7/2006
BR 0316110 9/2005
(Continued)

OTHER PUBLICATIONS

Ackermann, Prospects of Kinematic GPS Aerial Triangulation, ITC Journal, 1992.
(Continued)

*Primary Examiner* — Ali Bayat
(74) *Attorney, Agent, or Firm* — Dunlap Codding, P.C.

(57) ABSTRACT

Automated methods and systems for feature extraction are disclosed, including automated methods performed by at least one processor running computer executable instructions stored on at least one non-transitory computer readable medium, comprising determining and isolating an object of interest within a point cloud; forming a modified point cloud having one or more data points with first location coordinates of the object of interest; and generating a boundary outline having second location coordinates of the object of interest using spectral analysis of at least one section of at least one image identified with the first location coordinates and depicting the object of interest.

15 Claims, 15 Drawing Sheets

Related U.S. Application Data

(60) Provisional application No. 62/295,336, filed on Feb. 15, 2016, provisional application No. 62/411,284, filed on Oct. 21, 2016.

(51) Int. Cl.
*G06K 9/62* (2006.01)
*G06T 7/50* (2017.01)
*G06T 7/73* (2017.01)

(52) U.S. Cl.
CPC ....... *G06K 9/00637* (2013.01); *G06K 9/4652* (2013.01); *G06K 9/6221* (2013.01); *G06T 7/50* (2017.01); *G06T 7/73* (2017.01); *G06T 2207/10032* (2013.01); *G06T 2207/30184* (2013.01)

(58) Field of Classification Search
CPC ........... G06K 9/00201; G06K 9/00536; G06K 9/00637; G06K 9/4652; G06K 9/00798; G06K 9/3241
USPC ........................................................ 382/201
See application file for complete search history.

(56) References Cited

U.S. PATENT DOCUMENTS

| | | |
|---|---|---|
| 3,594,556 A | 7/1971 | Edwards |
| 3,614,410 A | 10/1971 | Bailey |
| 3,621,326 A | 11/1971 | Hobrough |
| 3,661,061 A | 5/1972 | Tokarz |
| 3,716,669 A | 2/1973 | Watanabe et al. |
| 3,725,563 A | 4/1973 | Woycechowsky |
| 3,864,513 A | 2/1975 | Halajian et al. |
| 3,866,602 A | 2/1975 | Furihata |
| 3,877,799 A | 4/1975 | O'Donnell |
| 4,015,080 A | 3/1977 | Moore-Searson |
| 4,044,879 A | 8/1977 | Stahl |
| 4,184,711 A | 1/1980 | Wakimoto |
| 4,240,108 A | 12/1980 | Levy |
| 4,281,354 A | 7/1981 | Conte |
| 4,344,683 A | 8/1982 | Stemme |
| 4,360,876 A | 11/1982 | Girault et al. |
| 4,382,678 A | 5/1983 | Thompson et al. |
| 4,387,056 A | 6/1983 | Stowe |
| 4,396,942 A | 8/1983 | Gates |
| 4,463,380 A | 7/1984 | Hooks |
| 4,489,322 A | 12/1984 | Zulch et al. |
| 4,490,742 A | 12/1984 | Wurtzinger |
| 4,491,399 A | 1/1985 | Bell |
| 4,495,500 A | 1/1985 | Vickers |
| 4,527,055 A | 7/1985 | Harkless et al. |
| 4,543,603 A | 9/1985 | Laures |
| 4,586,138 A | 4/1986 | Mullenhoff et al. |
| 4,635,136 A | 1/1987 | Ciampa et al. |
| 4,653,136 A | 3/1987 | Denison |
| 4,653,316 A | 3/1987 | Fukuhara |
| 4,673,988 A | 6/1987 | Jansson et al. |
| 4,686,474 A | 8/1987 | Olsen et al. |
| 4,688,092 A | 8/1987 | Kamel et al. |
| 4,689,748 A | 8/1987 | Hofmann |
| 4,707,698 A | 11/1987 | Constant et al. |
| 4,758,850 A | 7/1988 | Archdale et al. |
| 4,805,033 A | 2/1989 | Nishikawa |
| 4,807,024 A | 2/1989 | Mclaurin et al. |
| 4,814,711 A | 3/1989 | Olsen et al. |
| 4,814,896 A | 3/1989 | Heitzman et al. |
| 4,843,463 A | 6/1989 | Michetti |
| 4,899,296 A | 2/1990 | Khattak |
| 4,906,198 A | 3/1990 | Cosimano et al. |
| 4,953,227 A | 8/1990 | Katsuma et al. |
| 4,956,872 A | 9/1990 | Kimura |
| 5,034,812 A | 7/1991 | Rawlings |
| 5,086,314 A | 2/1992 | Aoki et al. |
| 5,121,222 A | 6/1992 | Endoh et al. |
| 5,138,444 A | 8/1992 | Hiramatsu |
| 5,155,597 A | 10/1992 | Lareau et al. |
| 5,164,825 A | 11/1992 | Kobayashi et al. |
| 5,166,789 A | 11/1992 | Myrick |
| 5,191,174 A | 3/1993 | Chang et al. |
| 5,200,793 A | 4/1993 | Ulich et al. |
| 5,210,586 A | 5/1993 | Grage et al. |
| 5,231,435 A | 7/1993 | Blakely |
| 5,247,356 A | 9/1993 | Ciampa |
| 5,251,037 A | 10/1993 | Busenberg |
| 5,265,173 A | 11/1993 | Griffin et al. |
| 5,267,042 A | 11/1993 | Tsuchiya et al. |
| 5,270,756 A | 12/1993 | Busenberg |
| 5,296,884 A | 3/1994 | Honda et al. |
| 5,335,072 A | 8/1994 | Tanaka et al. |
| 5,342,999 A | 8/1994 | Frei et al. |
| 5,345,086 A | 9/1994 | Bertram |
| 5,353,055 A | 10/1994 | Hiramatsu |
| 5,369,443 A | 11/1994 | Woodham |
| 5,402,170 A | 3/1995 | Parulski et al. |
| 5,414,462 A | 5/1995 | Veatch |
| 5,467,271 A | 11/1995 | Abel et al. |
| 5,481,479 A | 1/1996 | Wight et al. |
| 5,486,948 A | 1/1996 | Imai et al. |
| 5,506,644 A | 4/1996 | Suzuki et al. |
| 5,508,736 A | 4/1996 | Cooper |
| 5,555,018 A | 9/1996 | von Braun |
| 5,604,534 A | 2/1997 | Hedges et al. |
| 5,617,224 A | 4/1997 | Ichikawa et al. |
| 5,633,946 A | 5/1997 | Lachinski et al. |
| 5,668,593 A | 9/1997 | Lareau et al. |
| 5,677,515 A | 10/1997 | Selk et al. |
| 5,798,786 A | 8/1998 | Lareau et al. |
| 5,835,133 A | 11/1998 | Moreton et al. |
| 5,841,574 A | 11/1998 | Willey |
| 5,844,602 A | 12/1998 | Lareau et al. |
| 5,852,753 A | 12/1998 | Lo et al. |
| 5,894,323 A | 4/1999 | Kain et al. |
| 5,899,945 A | 5/1999 | Baylocq et al. |
| 5,963,664 A | 10/1999 | Kumar et al. |
| 6,037,945 A | 3/2000 | Loveland |
| 6,088,055 A | 7/2000 | Lareau et al. |
| 6,094,215 A | 7/2000 | Sundahl et al. |
| 6,097,854 A | 8/2000 | Szeliski et al. |
| 6,108,032 A | 8/2000 | Hoagland |
| 6,130,705 A | 10/2000 | Lareau et al. |
| 6,157,747 A | 12/2000 | Szeliski et al. |
| 6,167,300 A | 12/2000 | Cherepenin et al. |
| 6,222,583 B1 | 4/2001 | Matsumura et al. |
| 6,236,886 B1 | 5/2001 | Cherepenin et al. |
| 6,256,057 B1 | 7/2001 | Mathews et al. |
| 6,373,522 B2 | 4/2002 | Mathews et al. |
| 6,421,610 B1 | 7/2002 | Carroll et al. |
| 6,434,280 B1 | 8/2002 | Peleg et al. |
| 6,597,818 B2 | 7/2003 | Kumar et al. |
| 6,639,596 B1 | 10/2003 | Shum et al. |
| 6,711,475 B2 | 3/2004 | Murphy |
| 6,731,329 B1 | 5/2004 | Feist et al. |
| 6,747,686 B1 | 6/2004 | Bennett |
| 6,810,383 B1 | 10/2004 | Loveland |
| 6,816,819 B1 | 11/2004 | Loveland |
| 6,826,539 B2 | 11/2004 | Loveland |
| 6,829,584 B2 | 12/2004 | Loveland |
| 6,834,128 B1 | 12/2004 | Altunbasak et al. |
| 6,876,763 B2 | 4/2005 | Sorek et al. |
| 7,009,638 B2 | 3/2006 | Gruber et al. |
| 7,018,050 B2 | 3/2006 | Ulichney et al. |
| 7,046,401 B2 | 5/2006 | Dufaux et al. |
| 7,046,841 B1 | 5/2006 | Dow et al. |
| 7,061,650 B2 | 6/2006 | Walmsley et al. |
| 7,065,260 B2 | 6/2006 | Zhang et al. |
| 7,123,382 B2 | 10/2006 | Walmsley et al. |
| 7,127,348 B2 | 10/2006 | Smitherman et al. |
| 7,133,551 B2 | 11/2006 | Chen |
| 7,142,984 B2 | 11/2006 | Rahmes et al. |
| 7,184,072 B1 | 2/2007 | Loewen et al. |
| 7,233,691 B2 | 6/2007 | Setterholm |
| 7,262,790 B2 | 8/2007 | Bakewell |
| 7,348,895 B2 | 3/2008 | Lagassey |

(56) References Cited

U.S. PATENT DOCUMENTS

| | | | |
|---|---|---|---|
| 7,509,241 B2 | 3/2009 | Guo | |
| 7,728,833 B2 | 6/2010 | Verma | |
| 7,832,267 B2 | 11/2010 | Woro | |
| 7,844,499 B2 | 11/2010 | Yahiro | |
| 8,078,396 B2 | 12/2011 | Meadow | |
| 8,705,843 B2 | 4/2014 | Lieckfeldt | |
| 9,070,018 B1 | 6/2015 | Ciarcia et al. | |
| 10,013,507 B2* | 7/2018 | Zhang | G06K 9/00201 |
| 10,325,370 B1* | 6/2019 | Jabari | G06T 7/003 |
| 2002/0041328 A1 | 4/2002 | LeCompte et al. | |
| 2002/0041717 A1 | 4/2002 | Murata et al. | |
| 2002/0114536 A1 | 8/2002 | Xiong et al. | |
| 2003/0014224 A1 | 1/2003 | Guo et al. | |
| 2003/0043824 A1 | 3/2003 | Remboski et al. | |
| 2003/0088362 A1 | 5/2003 | Melero et al. | |
| 2003/0164962 A1 | 9/2003 | Nims et al. | |
| 2003/0214585 A1 | 11/2003 | Bakewell | |
| 2004/0105090 A1 | 6/2004 | Schultz et al. | |
| 2004/0167709 A1 | 8/2004 | Smitherman et al. | |
| 2005/0073241 A1 | 4/2005 | Yamauchi et al. | |
| 2005/0088251 A1 | 4/2005 | Matsumoto | |
| 2005/0169521 A1 | 8/2005 | Hel-Or | |
| 2006/0028550 A1 | 2/2006 | Palmer et al. | |
| 2006/0092043 A1 | 5/2006 | Lagassey | |
| 2006/0238383 A1 | 10/2006 | Kimchi et al. | |
| 2006/0250515 A1 | 11/2006 | Koseki et al. | |
| 2007/0024612 A1 | 2/2007 | Balfour | |
| 2007/0046448 A1 | 3/2007 | Smitherman | |
| 2007/0237420 A1 | 10/2007 | Steedly et al. | |
| 2008/0120031 A1 | 5/2008 | Rosenfeld et al. | |
| 2008/0123994 A1 | 5/2008 | Schultz et al. | |
| 2008/0158256 A1 | 7/2008 | Russell et al. | |
| 2008/0262789 A1 | 10/2008 | Pershing et al. | |
| 2009/0177458 A1 | 7/2009 | Hochart et al. | |
| 2009/0208095 A1 | 8/2009 | Zebedin | |
| 2009/0304227 A1 | 12/2009 | Kennedy et al. | |
| 2010/0208981 A1 | 8/2010 | Minear et al. | |
| 2010/0296693 A1 | 11/2010 | Thornberry et al. | |
| 2011/0033110 A1 | 2/2011 | Shimamura et al. | |
| 2013/0173632 A1 | 7/2013 | Birdwell et al. | |
| 2013/0246204 A1 | 9/2013 | Thornberry et al. | |
| 2013/0300740 A1* | 11/2013 | Snyder | G06F 3/016 345/420 |
| 2014/0081605 A1* | 3/2014 | Susaki | G06T 17/05 703/1 |
| 2014/0200861 A1 | 7/2014 | DeVito et al. | |
| 2015/0347872 A1 | 12/2015 | Taylor et al. | |
| 2015/0363645 A1* | 12/2015 | Chen | G06K 9/00637 382/173 |
| 2017/0091578 A1* | 3/2017 | Ananthakrishnan | G06K 9/00637 |

FOREIGN PATENT DOCUMENTS

| | | |
|---|---|---|
| CA | 2402234 | 9/2000 |
| CA | 2505566 | 5/2004 |
| CN | 1735897 A | 2/2006 |
| DE | 60017384 T | 3/2006 |
| DE | 60306301 T | 11/2006 |
| DK | 1418402 T | 10/2006 |
| EP | 1010966 | 2/1999 |
| EP | 1180967 | 2/2002 |
| EP | 1418402 | 5/2004 |
| EP | 1696204 | 8/2006 |
| ES | 2266704 T | 3/2007 |
| JP | 2003/317089 A | 11/2003 |
| MX | PA05004987 | 2/2006 |
| WO | WO99/18732 | 4/1999 |
| WO | WO/2000/053090 | 9/2000 |
| WO | WO/2004/044692 | 5/2004 |
| WO | WO/2005/088251 | 9/2005 |
| WO | WO/2008/028040 | 3/2008 |

OTHER PUBLICATIONS

Ciampa, John A., "Pictometry Digital Video Mapping", SPIE, vol. 2598, pp. 140-148, 1995.

Ciampa, J. A., Oversee, Presented at Reconstruction After Urban earthquakes, Buffalo, NY, 1989.

Dunford et al., Remote Sensing for Rural Development Planning in Africa, The Journal for the International Institute for Aerial Survey and Earth Sciences, 2:99-108, 1983.

Gagnon, P.A., Agnard, J. P., Nolette, C., & Boulianne, M., "A Micro-Computer based General Photogrammetric System", Photogrammetric Engineering and Remote Sensing, vol. 56, No. 5., pp. 623-625, 1990.

Konecny, G., "Issues of Digital Mapping", Leibniz University Hannover, Germany, GIS Ostrava 2008, Ostrava 27.-30.1.2008, pp. 1-8.

Konecny, G., "Analytical Aerial Triangulation with Convergent Photography", Department of Surveying Engineering, University of New Brunswick, pp. 37-57, 1966.

Konecny, G., "Interior Orientation and Convergent Photography", Photogrammetric Engineering, pp. 625-634, 1965.

Graham, Lee A., "Airborne Video for Near-Real-Time Vegetation Mapping", Journal of Forestry, 8:28-32, 1993.

Graham, Horita TRG-50 SMPTE Time-Code Reader, Generator, Window Inserter, 1990.

Hess, L.L, et al., "Geocoded Digital Videography for Validation of Land Cover Mapping in the Amazon Basin", International Journal of Remote Sensing, vol. 23, No. 7, pp. 1527-1555, 2002.

Hinthorne, J., et al., "Image Processing in the Grass GIS", Geoscience and Remote Sensing Symposium, 4:2227-2229, 1991.

Imhof, Ralph K., "Mapping from Oblique Photographs", Manual of Photogrammetry, Chapter 18, 1966.

Jensen, John R., Introductory Digital Image Processing: A Remote Sensing Perspective, Prentice-Hall, 1986; 399 pages Lapine, Lewis A., "Practical Photogrammetric Control by Kinematic GPS", GPS World, 1(3):44-49, 1990.

Lapine, Lewis A., Airborne Kinematic GPS Positioning for Photogrammetry—The Determination of the Camera Exposure Station, Silver Spring, MD, 11 pages, at least as early as 2000.

Linden et al., Airborne Video Automated Processing, US Forest Service Internal report, Fort Collins, CO, 1993.

Myhre, Dick, "Airborne Video System Users Guide", USDA Forest Service, Forest Pest Management Applications Group, published by Management Assistance Corporation of America, 6 pages, 1992.

Myhre et al., "An Airborne Video System Developed Within Forest Pest Management—Status and Activities", 10 pages, 1992.

Myhre et al., "Airborne Videography—A Potential Tool for Resource Managers"—Proceedings: Resource Technology 90, 2nd International Symposium on Advanced Technology in Natural Resource Management, 5 pages, 1990.

Myhre et al., Aerial Photography for Forest Pest Management, Proceedings of Second Forest Service Remote Sensing Applications Conference, Slidell, Louisiana, 153-162, 1988.

Myhre et al., "Airborne Video Technology", Forest Pest Management/ Methods Application Group, Fort Collins, CO, pp. 1-6, at least as early as Jul. 30, 2006.

Norton-Griffiths et al., 1982. "Sample surveys from light aircraft combining visual observations and very large scale color photography". University of Arizona Remote Sensing Newsletter 82-2:1-4.

Norton-Griffiths et al., "Aerial Point Sampling for Land Use Surveys", Journal of Biogeography, 15:149-156, 1988.

Novak, Rectification of Digital Imagery, Photogrammetric Engineering and Remote Sensing, 339-344, 1992.

Slaymaker, Dana M., "Point Sampling Surveys with GPS-logged Aerial Videography", Gap Bulletin No. 5, University of Idaho, http://www.gap.uidaho.edu/Bulletins/5/PSSwGPS.html, 1996.

Slaymaker, et al., "Madagascar Protected Areas Mapped with GPS-logged Aerial Video and 35mm Air Photos", Earth Observation magazine, vol. 9, No. 1, http://www.eomonline.com/Common/Archives/2000jan/00jan_tableofcontents.html, pp. 1-4, 2000.

(56) References Cited

OTHER PUBLICATIONS

Slaymaker, et al., "Cost-effective Determination of Biomass from Aerial Images", Lecture Notes in Computer Science, 1737:67-76, http://portal.acm.org/citation.cfm?id=648004.743267&coll=GUIDE&dl=, 1999.
Slaymaker, et al., "A System for Real-time Generation of Georeferenced Terrain Models", 4232A-08, SPIE Enabling Technologies for Law Enforcement Boston, MA, ftp://vis-ftp.cs.umass.edu/Papers/schultz/spie2000.pdf, 2000.
Slaymaker, et al.,"Integrating Small Format Aerial Photography, Videography, and a Laser Profiler for Environmental Monitoring", In ISPRS WG III/1 Workshop on Integrated Sensor Calibration and Orientation, Portland, Maine, 1999.
Slaymaker, et al., "Calculating Forest Biomass With Small Format Aerial Photography, Videography and a Profiling Laser", In Proceedings of the 17th Biennial Workshop on Color Photography and Videography in Resource Assessment, Reno, NV, 1999.
Slaymaker et al., Mapping Deciduous Forests in Southern New England using Aerial Videography and Hyperclustered Multi-Temporal Landsat TM Imagery, Department of Forestry and Wildlife Management, University of Massachusetts, 1996.
Star et al., "Geographic Information Systems an Introduction", Prentice-Hall, 1990.
Tomasi et al., "Shape and Motion from Image Streams: a Factorization Method"—Full Report on the Orthographic Case, pp. 9795-9802, 1992.
Warren, Fire Mapping with the Fire Mousetrap, Aviation and Fire Management, Advanced Electronics System Development Group, USDA Forest Service, 1986.
Welch, R., "Desktop Mapping with Personal Computers", Photogrammetric Engineering and Remote Sensing, 1651-1662, 1989.
Westervelt, James, "Introduction to GRASS 4", pp. 1-25, 1991.
"RGB Spectrum Videographics Report, vol. 4, No. 1, McDonnell Douglas Integrates RGB Spectrum Systems in Helicopter Simulators", pp. 1-6, 1995.
RGB "Computer Wall", RGB Spectrum, 4 pages, 1995.
"The First Scan Converter with Digital Video Output", Introducing . . . The RGB/Videolink 1700D-1, RGB Spectrum, 2 pages, 1995.
Erdas Field Guide, Version 7.4, A Manual for a commercial image processing system, 1990.
"Image Measurement and Aerial Photography", Magazine for all branches of Photogrammetry and its fringe areas, Organ of the German Photogrammetry Association, Berlin-Wilmersdorf, No. 1, 1958.
"Airvideo Analysis", MicroImages, Inc., Lincoln, NE, 1 page, Dec. 1992.
Zhu, Zhigang, Hanson, Allen R., "Mosaic-Based 3D Scene Representation and Rendering", Image Processing, 2005, ICIP 2005, IEEE International Conference on 1(2005).
Mostafa, et al., "Direct Positioning and Orientation Systems How do they Work? What is the Attainable Accuracy?", Proceeding, American Society of Photogrammetry and Remote Sensing Annual Meeting, St. Louis, MO, Apr. 24-27, 2001.
"POS AV" georeferenced by APPLANIX aided inertial technology, http://www.applanix.com/products/posav_index.php.
Mostafa, et al., "Ground Accuracy from Directly Georeferenced Imagery", Published in GIM International vol. 14 N. 12 Dec. 2000.
Mostafa, et al., "Airborne Direct Georeferencing of Frame Imagery: An Error Budget", The 3$^{rd}$ International Symposium on Mobile Mapping Technology, Cairo, Egypt, Jan. 3-5, 2001.
Mostafa, M.R. and Hutton, J., "Airborne Kinematic Positioning and Attitude Determination Without Base Stations", Proceedings, International Symposium on Kinematic Systems in Geodesy, Geomatics, and Navigation (KIS 2001) Banff, Alberta, Canada, Jun. 4-8, 2001.
Mostafa, et al., "Airborne DGPS Without Dedicated Base Stations for Mapping Applications", Proceedings of ION-GPS 2001, Salt Lake City, Utah, USA, Sep. 11-14.
Mostafa, "ISAT Direct Exterior Orientation QA/QC Strategy Using POS Data", Proceedings of OEEPE Workshop: Integrated Sensor Orientation, Hanover, Germany, Sep. 17-18, 2001.
Mostafa, "Camera/IMU Boresight Calibration: New Advances and Performance Analysis", Proceedings of the ASPRS Annual Meeting, Washington, D.C., Apr. 21-26, 2002.
Hiatt, "Sensor Integration Aids Mapping at Ground Zero", Photogrammetric Engineering and Remote Sensing, Sep. 2002, p. 877-878.
Mostafa, "Precision Aircraft GPS Positioning Using CORS", Photogrammetric Engineering and Remote Sensing, Nov. 2002, p. 1125-1126.
Mostafa, et al., System Performance Analysis of INS/DGPS Integrated System for Mobile Mapping System (MMS), Department of Geomatics Engineering, University of Calgary, Commission VI, WG VI/4, Mar. 2004.
Artes F., & Hutton, J., "GPS and Inertial Navigation Delivering", Sep. 2005, GEOconnexion International Magazine, p. 52-53, Sep. 2005.
"POS AV" Applanix, Product Outline, airborne@applanix.com, 3 pages, Mar. 28, 2007.
POSTrack, "Factsheet", Applanix, Ontario, Canada, www.applanix.com, Mar. 2007.
POS AV "Digital Frame Camera Applications", 3001 Inc., Brochure, 2007.
POS AV "Digital Scanner Applications", Earthdata Brochure, Mar. 2007.
POS AV "Film Camera Applications" AeroMap Brochure, Mar. 2007.
POS AV "LIDAR Applications" MD Atlantic Brochure, Mar. 2007.
POS AV "OEM System Specifications", 2005.
POS AV "Synthetic Aperture Radar Applications", Overview, Orbisat Brochure, Mar. 2007.
"POSTrack V5 Specifications" 2005.
"Remote Sensing for Resource Inventory Planning and Monitoring", Proceeding of the Second Forest Service Remote Sensing Applications Conference—Slidell, Louisiana and NSTL, Mississippi, Apr. 11-15, 1988.
"Protecting Natural Resources with Remote Sensing", Proceeding of the Third Forest Service Remote Sensing Applications Conference—Apr. 9-13, 1990.
Heipke, et al, "Test Goals and Test Set Up for the OEEPE Test—Integrated Sensor Orientation", 1999.
Kumar, et al., "Registration of Video to Georeferenced Imagery", Sarnoff Corporation, CN5300, Princeton, NJ, 1998.
McConnel, Proceedings Aerial Pest Detection and Monitoring Workshop—1994.pdf, USDA Forest Service Forest Pest Management, Northern Region, Intermountain region, Forest Insects and Diseases, Pacific Northwest Region.
"Standards for Digital Orthophotos", National Mapping Program Technical Instructions, US Department of the Interior, Dec. 1996.
Tao, "Mobile Mapping Technology for Road Network Data Acquisition", Journal of Geospatial Engineering, vol. 2, No. 2, pp. 1-13, 2000.
"Mobile Mapping Systems Lesson 4", Lesson 4 SURE 382 Geographic Information Systems II, pp. 1-29, Jul. 2, 2006.
Konecny, G., "Mechanische Radialtriangulation mit Konvergentaufnahmen", Bildmessung and Luftbildwesen, 1958, Nr. 1.
Myhre, "ASPRS/ACSM/RT 92" Technical papers, Washington, D.C., vol. 5 Resource Technology 92, Aug. 3-8, 1992.
Rattigan, "Towns get new view from above," *The Boston Globe*, Sep. 5, 2002.
Mostafa, et al., "Digital image georeferencing from a multiple camera system by GPS/INS," *ISPRS Journal of Photogrammetry & Remote Sensing*, 56(1): I-12, Jun. 2001.
Dillow, "Grin, or bare it, for aerial shot," *Orange County Register* (California), Feb. 25, 2001.
Anonymous, "Live automatic coordinates for aerial images," *Advanced Imaging*, 12(6):51, Jun. 1997.
Anonymous, "Pictometry and US Geological Survey announce—Cooperative Research and Development Agreement," Press Release published Oct. 20, 1999.
Miller, "Digital software gives small Arlington the Big Picture," *Government Computer NewsState & Local*, 7(12), Dec. 2001.

(56) References Cited

OTHER PUBLICATIONS

Garrett, "Pictometry: Aerial photography on steroids," *Law Enforcement Technology* 29(7):114-116, Jul. 2002.
Weaver, "County gets an eyeful," *The Post-Standard* (Syracuse, NY), May 18, 2002.
Reed, "Firm gets latitude to map O.C. in 3D," *Orange County Register* (California), Sep. 27, 2000.
Reyes, "Orange County freezes ambitious aerial photography project," *Los Angeles Times*, Oct. 16, 2000.
Aerowest Pricelist of Geodata as of Oct. 21, 2005 and translations to English 3 pages.
www.archive.org Web site showing archive of German AeroDach Web Site http://www.aerodach.de from Jun. 13, 2004 (retrieved Sep. 20, 2012) and translations to English 4 pages.
AeroDach® Online Roof Evaluation Standard Delivery Format and 3D Data File: Document Version 01.00.2002 with publication in 2002, 13 pages.
Noronha et al., "Detection and Modeling of Building from Multiple Aerial Images," Institute for Robotics and Intelligent Systems, University of Southern California, Nov. 27, 2001, 32 pages.
Applicad Reports dated Nov. 25, 1999-Mar. 9, 2005, 50 pages.
Applicad Online Product Bulletin archive from Jan. 7, 2003, 4 pages.
Applicad Sorcerer Guide, Version 3, Sep. 8, 1999, 142 pages.
Xactimate Claims Estimating Software archive from Feb. 12, 2010, 8 pages.
Bignone et al, Automatic Extraction of Generic House Roofs from High Resolution Aerial Imagery, Communication Technology Laboratory, Swiss Federal Institute of Technology ETH, CH-8092 Zurich, Switzerland, 12 pages, 1996.
Geospan 2007 Job proposal.
Greening et al., Commercial Applications of GPS-Assisted Photogrammetry, Presented at GIS/LIS Annual Conference and Exposition, Phoenix, AZ, Oct. 1994.
Applanix Corp, Robust, Precise Position and Orientation Solutions, POS/AV & POS/DG Installation & Operation Manual, Redefining the way you survey, May 19, 1999, Ontario, Canada.
Applanix Corp, Robust, Precise Position and Orientation Solutions, POS/AV V4 Ethernet & Disk Logging ICD, Redefining the way you survey, Revision 3, Apr. 18, 2001, Ontario, Canada.
International Search Report and Written Opinion regarding PCT App. No. PCT/US2017/017196 dated Apr. 25, 2017, 25 pages.
Sampath et al. *Segmentation and Reconstruction of Polyhedral Building Roofs from Aerial Lidar Point Clouds*. IEEE Transactions on Geoscience and Remote Sensing. vol. 48, Issue 3, pp. 1554-1567, Nov. 3, 2009. Retrieved from the internet: https://www.researchgate.net/profile/Ajit_Sampath/publication/272818639_IEEE_Roof_Reconstruction/links/54ef7bc70cf2495330e27871.pdf.
European Patent Office, Extended European Search Report regarding European Patent App. No. 3403050 dated Jul. 23, 2019.
Rau et al., "Analysis of Oblique Aerial Images for Land Cover and Point Cloud Classification in an Urban Environment," IEEE Transactions on Geoscience and Remote Sensing, vol. 53, No. 3, Mar. 2015.

\* cited by examiner

AUTOMATED SYSTEM AND METHODOLOGY FOR FEATURE EXTRACTION

INCORPORATION BY REFERENCE

The present disclosure is a divisional patent application of U.S. Ser. No. 15/428,860, filed Feb. 9, 2017, which claims priority to the provisional patent application identified by U.S. Ser. No. 62/295,336, filed on Feb. 15, 2016, entitled "Automated System and Methodology for Feature Extraction", and to the provisional patent application identified by U.S. Ser. No. 62/411,284, filed on Oct. 21, 2016, entitled "Automated System and Methodology for Feature Extraction," the entire contents of all of which are hereby incorporated herein by reference.

BACKGROUND

Feature extraction within images holds a multitude of uses over multiple industries. The identification of elements or features within an image, or even absent from an image, provides valuable information. Prior art uses of human identification, however, wastes time and energy, in addition to variances between human extractors.

For example, residential and/or commercial property owners approaching a major roofing project may be unsure of the amount of material needed and/or the next step in completing the project. Generally, such owners contact one or more contractors for a site visit. Each contractor must physically be present at the site of the structure in order to make a determination on material needs and/or time. The time and energy for providing such an estimate becomes laborious and may be affected by contractor timing, weather, contractor education, and the like. Estimates may be varied even between contractors in determination of estimated square footage causing variance in supply ordering as well. Additionally, measuring an actual roof may be costly and potentially hazardous—especially with steeply pitched roofs. Completion of a proposed roofing project may depend on ease in obtaining a simplified roofing estimate and/or obtaining reputable contractors for the roofing project.

Remote sensing technology has the ability to be more cost effective than manual inspection while providing pertinent information for assessment of roofing projects. Images are currently being used to measure objects and structures within the images, as well as to be able to determine geographic locations of points within the image when preparing estimates for a variety of construction projects, such as roadwork, concrete work, and roofing. See for example U.S. Pat. No. 7,424,133 that describes techniques for measuring within oblique images. Also see for example U.S. Pat. No. 8,145,578 that describe techniques for allowing the remote measurements of the size, geometry, pitch and orientation of the roof sections of the building and then uses the information to provide an estimate to repair or replace the roof, or to install equipment thereon. Estimating construction projects using software increases the speed at which an estimate is prepared, and reduces labor and fuel costs associated with on-site visits.

Further, feature extraction, or cataloguing feature extraction, can go beyond features represented within an image and provide useful information on features missing from an image. For example, tree density within a forest, or changes to the tree density over time, may be determined using lack of trees, a feature within a known area of an image. Thus, the location of missing feature may be determined relevant in feature extraction of the image.

BRIEF DESCRIPTION OF SEVERAL VIEWS OF THE DRAWINGS

To assist those of ordinary skill in the relevant art in making and using the subject matter hereof, reference is made to the appended drawings, which are not intended to be drawn to scale, and in which like reference numerals are intended to refer to similar elements for consistency. For purposes of clarity, not every component may be labeled in every drawing.

DETAILED DESCRIPTION

Figure 1:
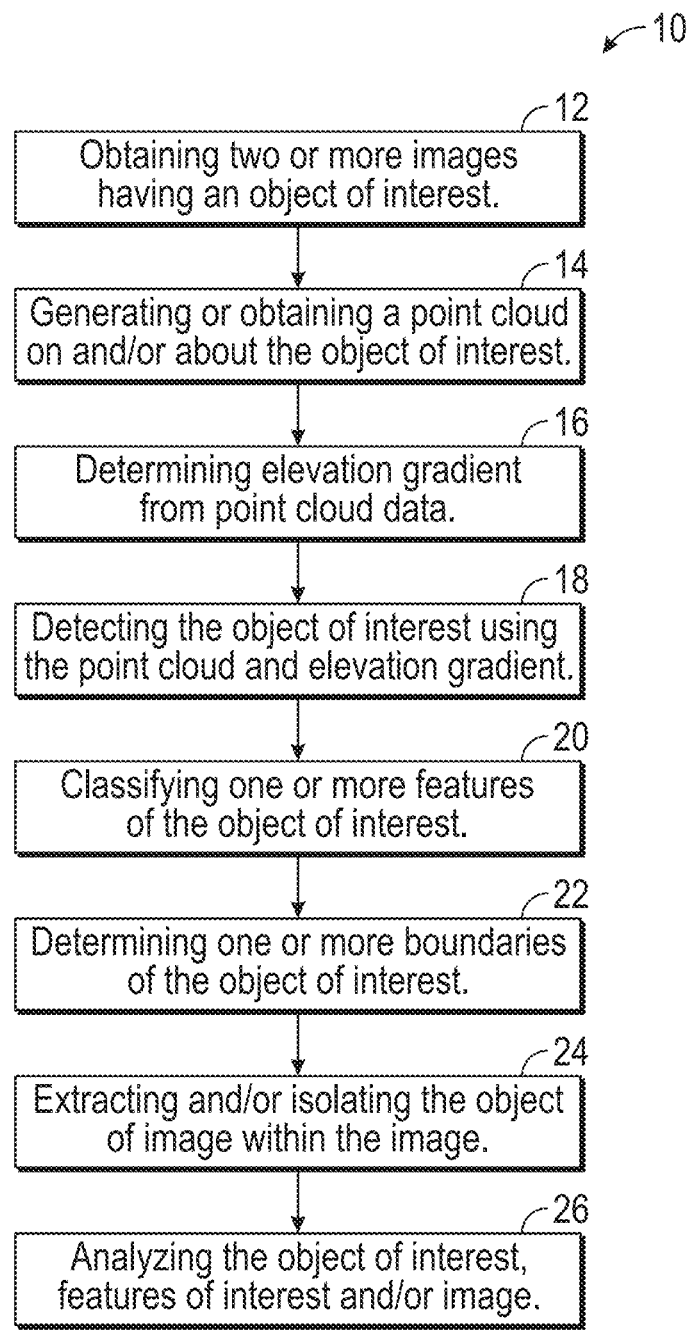
FIG. 1 illustrates a block diagram for automatic feature extraction of one or more natural and/or man-made structures within an image, in accordance with the present disclosure.

Before explaining at least one embodiment of the disclosure in detail, it is to be understood that the disclosure is not limited in its application to the details of construction, experiments, exemplary data, and/or the arrangement of the components set forth in the following description or illustrated in the drawings unless otherwise noted.

The disclosure is capable of other embodiments or of being practiced or carried out in various ways. For example, although the roofing industry may be used as an example, feature extraction in one or more images in any industry is contemplated. Additionally, identification of features absent within one or more images is also contemplated. Also, it is to be understood that the phraseology and terminology employed herein is for purposes of description, and should not be regarded as limiting.

The following detailed description refers to the accompanying drawings. The same reference numbers in different drawings may identify the same or similar elements.

As used in the description herein, the terms "comprises," "comprising," "includes," "including," "has," "having," or any other variations thereof, are intended to cover a non-exclusive inclusion. For example, unless otherwise noted, a process, method, article, or apparatus that comprises a list of elements is not necessarily limited to only those elements, but may also include other elements not expressly listed or inherent to such process, method, article, or apparatus.

Further, unless expressly stated to the contrary, "or" refers to an inclusive and not to an exclusive "or". For example, a condition A or B is satisfied by one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more, and the singular also includes the plural unless it is obvious that it is meant otherwise. Further, use of the term "plurality" is meant to convey "more than one" unless expressly stated to the contrary.

As used herein, any reference to "one embodiment," "an embodiment," "some embodiments," "one example," "for example," or "an example" means that a particular element, feature, structure or characteristic described in connection with the embodiment is included in at least one embodiment. The appearance of the phrase "in some embodiments" or "one example" in various places in the specification is not necessarily all referring to the same embodiment, for example.

Circuitry, as used herein, may be analog and/or digital components, or one or more suitably programmed processors (e.g., microprocessors) and associated hardware and software, or hardwired logic. Also, "components" may perform one or more functions. The term "component," may include hardware, such as a processor (e.g., microprocessor), an application specific integrated circuit (ASIC), field programmable gate array (FPGA), a combination of hardware and software, and/or the like. The term "processor" as used herein means a single processor or multiple processors working independently or together to collectively perform a task.

Software may include one or more computer readable instructions that when executed by one or more components cause the component to perform a specified function. It should be understood that the algorithms described herein may be stored on one or more non-transitory computer readable medium. Exemplary non-transitory computer readable mediums may include random access memory, read only memory, flash memory, and/or the like. Such non-transitory computer readable mediums may be electrically based, optically based, and/or the like.

It is to be further understood that, as used herein, the term user is not limited to a human being, and may comprise, a computer, a server, a website, a processor, a network interface, a human, a user terminal, a virtual computer, combinations thereof, and the like, for example.

Referring now to the Figures, and in particular to FIG. 1, shown therein is a flow chart 10 of an exemplary method for automatically extracting features of one or more natural and/or man-made structures within an image. Using a combination of point cloud data and spectral analysis, features within one or more images may be extracted. Alternatively, using a combination of point cloud data and spectral analysis, missing features within an image may be determined. Further, in some embodiments, features within images and/or missing features within images may be catalogued (e.g., spatial cataloguing) within one or more databases for retrieval and/or analysis. For example, measurements of features (e.g., size of building(s), height of tree(s), footprint(s) of man-made or non-man-made features) may be obtained. In some embodiments, such features may be stored in one or more database with measurements of features associated therewith, in addition to other metadata associated with the feature and/or image (e.g., date, algorithms used).

Generally, one or more images having raster data depicting an object of interest (e.g., a building) may be obtained and stored in a geospatial database to be available for use in creating and/or interpreting a point cloud that overlaps with the one or more images, as shown in step 12. The raster data depicting the object of interest may depict colors of visible light in mostly three bands (red, green, and blue) or one or more other modalities. For example, the raster data may include information for hyperspectral imaging which collects and processes information from across the electromagnetic spectrum. In some embodiments, the raster data may include near infrared data or thermal data. Each image may be geo-referenced such that geographical coordinates are provided for each point in the images. Geo-referencing may include associating each image, e.g., raster data, with camera pose parameters indicative of internal orientation information of the camera, and external orientation information of the camera. Internal orientation information includes, but is not limited to, known or determinable characteristics including focal length, sensor size and aspect ratio, radial and other distortion terms, principal point offset, pixel pitch, and alignment. External orientation information includes, but is not limited to, altitude, orientation in terms of roll, pitch and yaw, and the location of the camera relative to the Earth's surface. The internal and external orientation information can be obtained in a manner described, for example, in U.S. Pat. No. 7,424,133. Alternatively, or in addition, the internal and external orientation information can be obtained from analyzing overlapping images using any suitable technique, such as bundle-adjustment. Techniques for bundle adjustment are described, for example, in U.S. Pat. Nos. 6,996,254 and 8,497,905. The internal and external orientation information can be stored within metadata of the image, or can be stored separately from the image and associated with the image utilizing any suitable technique, such as a unique code for each image stored within a look-up field within the geospatial database.

In step 14, a point cloud may be generated or obtained on and/or about the object of interest. The point cloud may be generated using a 3D scanner, a detection system that works on the principle of radar, but uses light from a laser (these systems are known in the art and identified by the acronym "Lidar"), or from the images stored in the geospatial database using the internal and external orientation information for the images. Techniques for generating a point cloud using internal and external information for the images as well as feature matching techniques are known to those skilled in the art. For example, suitable computer programs for the photogrammetric creation of point clouds include Agisoft Photoscan by Agisoft; Metigo 3D by fokus GmbH Leipzig; 123D Catch by Autodesk; Pix4Dmapper by Pix4D; and DroneMapper by DroneMapper. Point clouds include a series of points in which each point may be identified with a three-dimensional (e.g., X, Y, and Z) position. The three-dimensional position of points representing man-made or natural objects can be classified as such using the relative position of the points relative to other points, as well as the shape of a grouping of the points. Further analysis can be conducted on these points as well as images correlated with the points to extract features of the objects represented in the point cloud. In some embodiments, the point cloud may be formed such that all features having known locations within three dimensions are represented. The point cloud(s) can be saved in any suitable format, such as point data, DSM/DTM, CAD, Tiff, Autodesk cloud, GeoTiff, and KMZ, for example.

Because the three-dimensional position on the Earth of each point in the point cloud is known, in a step 16, the Z values of the points can be analyzed to determine whether the points represent the ground, or a man-made or natural object located above the ground. In some embodiments, an elevation value or an elevation gradient may be used to analyze the point cloud data to determine whether particular points represent the ground, a man-made object, or a natural object above the ground. In some embodiments, classification of ground surface and non-ground surface may be determined for each data point. Identification of features on the ground surface versus features on a non-ground surface may aid in differentiation between features within the image. For example, a shadow created by a roof may have similar characteristics to the roof and be difficult for detection within an image using spectral analysis. Identification that the shadow is on the ground surface, however, would differentiate the shadow of the roof from the actual roof.

Data points can be transformed with information classifying the type of object that the data point represents. For example, data points indicative of the ground surface may be classified within the point cloud as being part of the ground surface. In some embodiments, data points of certain type(s) of objects can be removed from the point cloud to enhance processing of the remaining type(s) of objects within a modified point cloud. For example, all of the data points classified as being part of the ground surface may be removed from the point cloud to enhance the analysis of the points representing man-made objects or natural objects.

Certain objects of interest (e.g., man-made objects or natural objects) may be identified, and in a step 18, the object of interest may be detected using the point cloud and elevation gradient. In some embodiments, man-made structures, natural structures, and ground structures may also be determined. Natural structures and ground structures may be classified, and/or removed from the point cloud forming a modified point cloud. For example, assuming that buildings are the object of interest, points in the point cloud representing the building will have a higher elevation (e.g., Z value) than points in the point cloud representing the ground surface. In this case, the points having a lower elevation Z-value than adjacent points can be classified as the ground surface, and the other points in the point cloud can be initially classified as either a man-made structure, or a natural structure. The classification can be accomplished by storing additional data within the point cloud. Even further, an elevation of interest may be determined and all data points below the elevation of interest may be classified as the ground structure, or all data points above the elevation of interest may be classified as a natural object or a man-made object.

It should be noted that a point cloud is not needed for identification of features within an image or missing features within an image as described herein. The point cloud may aid in identification of ground surface versus non-ground surface, but is not a mandatory step in determination of features within an image or features missing within an image.

In a step 20, the points within the point cloud that are initially classified as not being part of the ground structure, are further analyzed to determine whether the points represent a man-made object (e.g., a building), or a natural object, (e.g., a tree). This can be accomplished by analyzing the shape of a grouping of the points. Groupings of points having planar surfaces (e.g., roof section(s)) detectable within the point cloud can be classified as a man-made object, and groupings of points devoid of planar surfaces (e.g., tree(s)) detectable within the point cloud can be classified as a natural object. This can be accomplished by analyzing a variation of surface normal direction between each point of a group of points and the other points within the group.

Once this analysis has been accomplished, the points are classified as either representing a man-made object or a natural object. Then, points within the point cloud that represent the man-made object, for example, can be further analyzed to determine one or more features (e.g., roof) of the object of interest (e.g., building). In some embodiments, the features may be classified using the modified point cloud in which the points have been classified, and/or certain points have been removed from the point cloud. In a step 22, one or more first information, (e.g., initial boundary) of the object of interest may be determined by looking for an outer boundary of a group of points, as well as analyzing the Z value of the points and looking for differences above a threshold between the Z values of adjacent points. In some embodiments, the boundaries of the object of interest may be further determined and/or refined using a first location (e.g., latitude and longitude) of the points within the point cloud that are determined to be part of the object of interest and querying the geospatial database to obtain images having raster data depicting the object of interest. Then, standard edge detection methods and/or spectral analysis can be used to precisely determine second information, e.g., the boundary of the object of interest having second location coordinates. The second location coordinates can be X, Y pixel coordinates, or latitude/longitude and elevation. In some embodiments, the first information (e.g., initial boundary) may be initially determined using the point cloud or modified point cloud, and then refined to generate second information by registering the point cloud data or modified point cloud data with the raster data within one or more images, and then analyzing the raster data with one or more suitable image processing technique. Examples of suitable image processing techniques include, but are not limited to standard edge detection methods or spectral analysis methods.

Spectral analysis may be used to group data points of an object of interest. For example, data points of a feature within an image may have similar spectral signatures such that reflected and/or absorbed electromagnetic radiation may be similar and able to be differentiated from data points of other features within the image. For example, data points of a building may have spectral signatures different from data points of grass surrounding the building. Data points within the image having similar spectral signatures may thus be grouped to identify one or more features within the image. Exemplary spectral analysis methods are described in U.S. Pat. No. 9,070,018, the entire content of which is incorporated herein by reference.

In some embodiments, thermal analysis of the object of interest may be used to group data points of objects of interest having similar or different thermal signatures. For example, a thermographic camera may be used to obtain an image using infrared radiation. Data points may be grouped based on temperature measurements of each feature within the image. Thermal analysis may be in addition to, or in lieu of a typical image (e.g., RGB image).

In a step 24, the object of interest may be extracted, classified, and/or isolated within the image. Additionally, the object of interest may be cataloged within one or more database. Cataloging may be via address, size of feature(s) and/or object of interest, color(s) of features and/or object of interest, feature type, spatial relations (e.g., address, coordinates), and/or the like. For example, in some embodiments, the object of interest may be spatially cataloged within one or more database. To that end, one or more features of the object of interest may be isolated and/or extracted. One or more outlines of the one or more features may also be determined e.g., polygon outline of one facet of a roof. Each line of the outline may be spatially stored within a database such that retrieval may be via coordinates, address, and/or the like.

In a step 26, further analysis of the object of interest and/or the image may be performed. For example, when the present disclosure is used for analyzing a roof of a building and the data points include the three-dimensional position of the part of the object represented by the data points, data points representing the outer boundaries can be used to calculate the perimeter of the roof; data points representing a ridge and a valley bordering a roof section can be used to calculate a pitch of the roof section. These techniques can be used to calculate a variety of roof features, roof dimensions, and/or roof pitch of sections of the roof. The roof outline can be saved as a data file using any suitable format, such as a vector format, or a raster format. The calculated data and the data file of the roof outline can be saved in the geospatial database or a separate database that may or may not be correlated with the geospatial database. Further, the latitude and longitude of the data points can be used to determine a physical address of a particular object of interest (e.g., building) and such address can be stored with the calculated data. The calculated data, the image data and the address can be correlated together, and automatically used to populate a template thereby preparing a predetermined report about the object of interest including one or more images of the object of interest and calculated data about the object of interest. This methodology can be automatically executed by one or more processors as discussed herein to identify and obtain information about objects of interest for a variety of purposes. For example, the methodology can be automatically executed by one or more processors to generate reports for a plurality of objects of interest, without manual or human intervention. Thus, the presently described methodology provides a performance increase over conventional methods for generating object reports, as well as an enhancement to the operation of the processor when generating reports for one or more objects of interest.

Examples of the hardware/software for obtaining the images and performing the steps described above will now be described.

Figure 2:
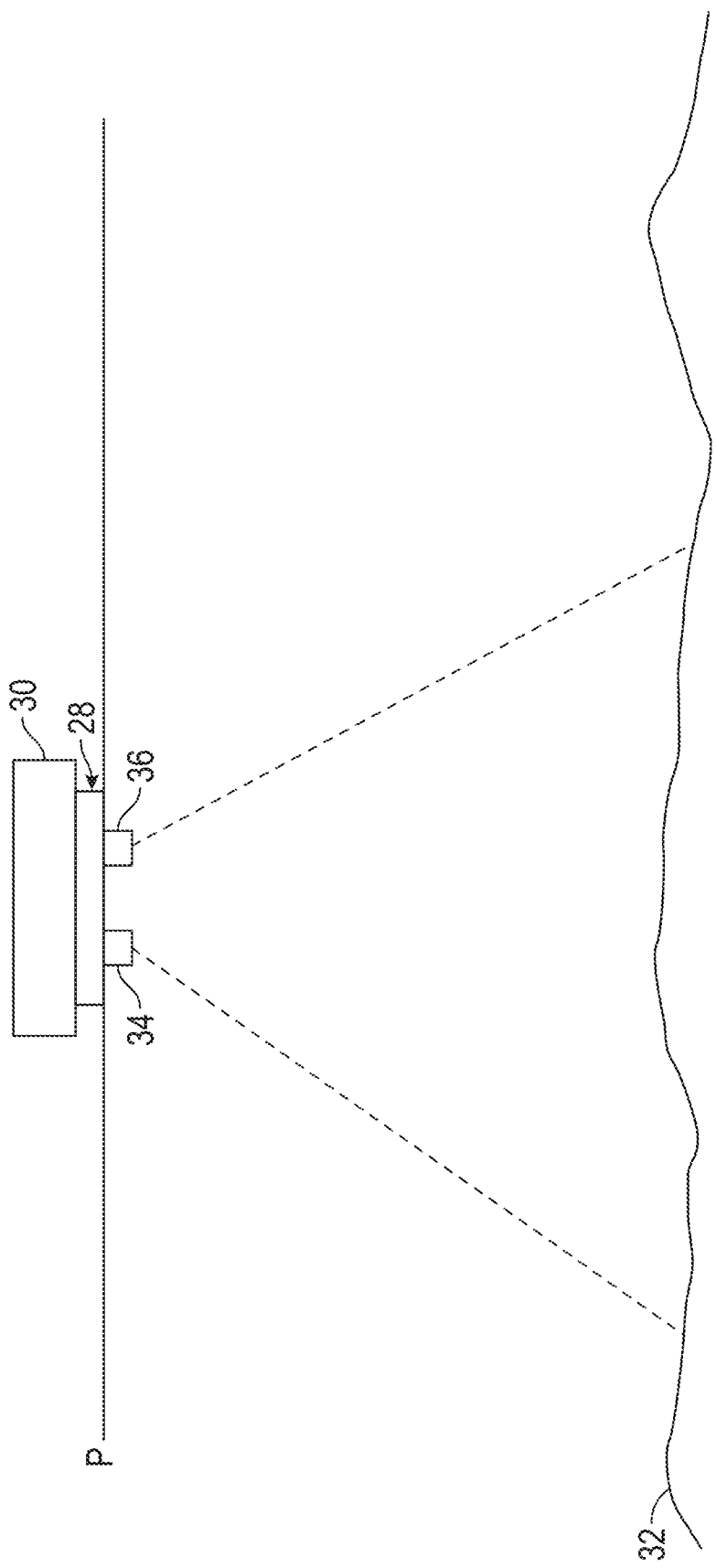
FIG. 2 illustrates a schematic diagram of hardware forming an exemplary embodiment of a system for automatic feature extraction of one or more natural and/or man-made structures within an image. The system includes an image capturing system and a computer system.

Referring to FIGS. 1 and 2, in some embodiments, an image capturing system 28 may be used to obtain the one or more images. The image capturing system 28 may include a platform 30 carrying the image capturing system 28. The platform 30 may be an airplane, unmanned aerial system, space shuttle, rocket, satellite, and/or any other suitable vehicle capable of carrying the image capturing system 28. For example, in some embodiments, the platform 30 may be a fixed wing aircraft.

The platform 30 may carry the image capturing system 28 at one or more altitudes above a ground surface 32. For example, the platform 30 may carry the image capturing system 28 over a predefined area and at one or more predefined altitudes above the Earth's surface and/or any other surface of interest. In FIG. 2, the platform 30 is illustrated carrying the image capturing system 28 at a plane P above the ground surface 32.

The platform 30 may be capable of controlled movement and/or flight. As such, the platform 30 may be manned or unmanned. In some embodiments, the platform 30 may be capable of controlled movement and/or flight along a predefined flight path and/or course. For example, the platform 30 may be capable of controlled movement and/or flight along the Earth's atmosphere and/or outer space.

The platform 30 may include one or more systems for generating and/or regulating power. For example, the platform 30 may include one or more generators, fuel cells, solar panels, and/or batteries for powering the image capturing system 28.

Figure 3:
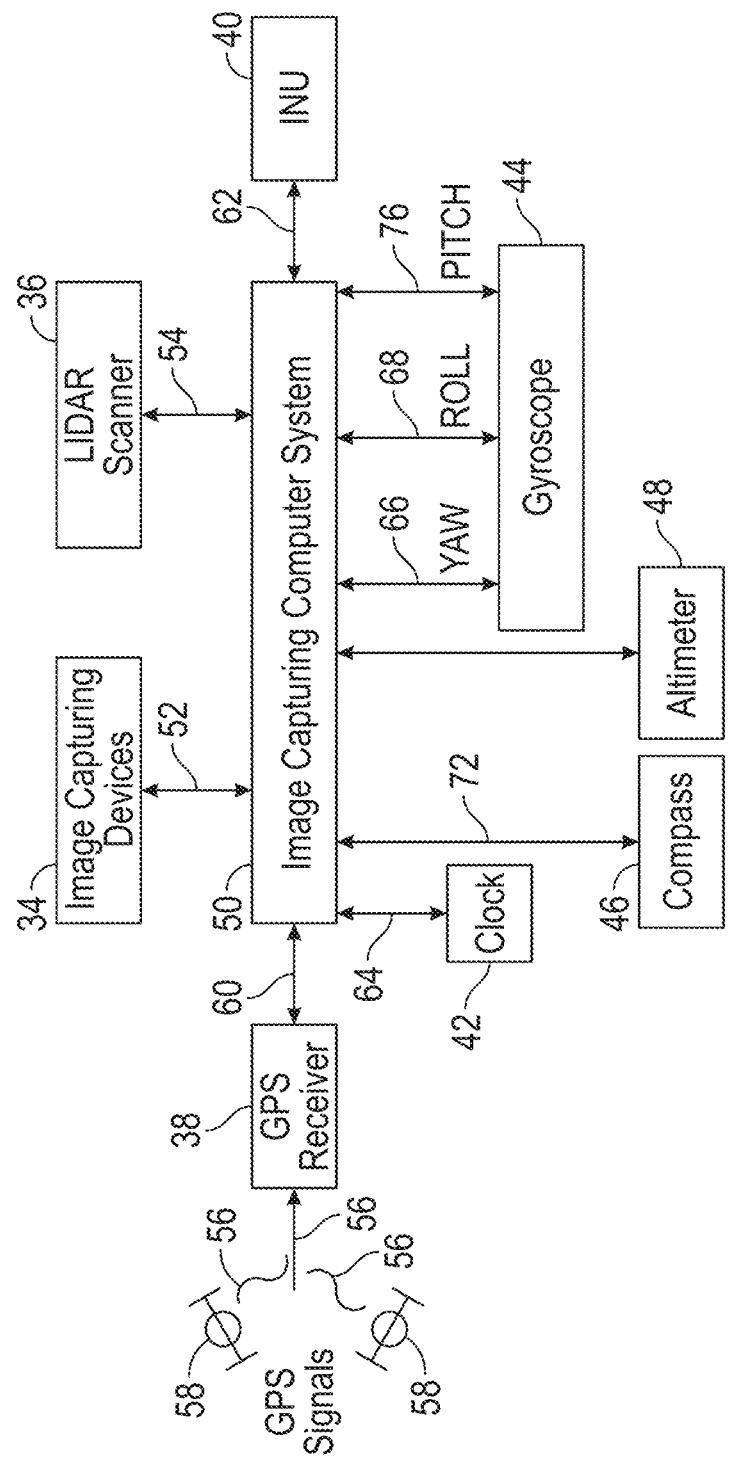
FIG. 3 illustrates a diagrammatic view of an example of the image-capturing system of FIG. 2.

Referring to FIGS. 2 and 3, the image capturing system 28 may include one or more image capturing devices 34 configured to obtain an image from which a point cloud may be generated. In some embodiments, the image capturing system 28 may optionally include one or more LIDAR scanners 36 to generate data that can be used to create a point cloud. Additionally, in some embodiments, the image capturing system 28 may include one or more global positioning system (GPS) receivers 38, one or more inertial navigation units (INU) 40, one or more clocks 42, one or more gyroscopes 44, one or more compasses 46, and one or more altimeters 48. In some embodiments, the image capturing system 28 may include one or more thermographic cameras configured to capture one or more thermographic images. One or more of these elements of the image capturing system 28 may be interconnected with an image capturing and processing computer system 50. In some embodiments, the internal and external orientation information for the images can be determined during post processing using an image processing technique, such as bundle adjustment. In these embodiments, the image capturing system 28 may not include the one or more INU 40.

In some embodiments, the one or more image capturing devices 34 may be capable of capturing images photographically and/or electronically. The one or more image capturing devices 34 may be capable and/or configured to provide oblique and/or vertical images, and may include, but are not limited to, conventional cameras, digital cameras, digital sensors, charge-coupled devices, thermographic cameras and/or the like. In some embodiments, the one or more image capturing devices 34 may be one or more ultra-high resolution cameras. For example, in some embodiments, the one or more image capturing devices 34 may be ultra-high resolution capture systems, such as may be found in the Pictometry PentaView Capture System, manufactured and used by Pictometry International based in Henrietta, N.Y.

The one or more image capturing devices 34 may include known or determinable characteristics including, but not limited to, focal length, sensor size, aspect ratio, radial and other distortion terms, principal point offset, pixel pitch, alignment, and/or the like.

The one or more image capturing devices 34 may acquire one or more images and issue one or more image data signals 52 corresponding to one or more particular images taken. Such images may be stored in the image capturing and processing computer system 50.

The LIDAR scanner 36 may determine a distance between the platform 30 and objects on or about the ground surface 32 by illuminating a laser and analyzing the reflected light to provide data points. In some embodiments, software associated with the LIDAR scanner 36 may generate a depth map or point cloud based on the measured distance between the platform 30 on and/or about the object of interest. To that end, the LIDAR scanner 36 may issue one or more data signals 54 to the image capturing and processing computer system 50 of such data points providing a point cloud wherein each data point may represent a particular coordinate. An exemplary LIDAR scanner 36 may be the Riegl LMS-Q680i, manufactured and distributed by Riegl Laser Measurement Systems located in Horn, Austria. It should be noted that distance between the platform 30 and objects on or about the ground surface 32 may be determined via other methods including, but not limited to, stereographic methods.

In some embodiments, the LIDAR scanner 36 may be a downward projecting high pulse rate LIDAR scanning system. It should be noted that other three-dimensional optical distancing systems or intensity-based scanning techniques may be used. In some embodiments, the LIDAR scanner 36 may be optional as a point cloud may be generated using one or more images and photogrammetric image processing techniques, e.g., the images may be geo-referenced using position and orientation of the image capturing devices 34 and matched together to form the point cloud.

The GPS receiver 38 may receive global positioning system (GPS) signals 56 that may be transmitted by one or more global positioning system satellites 58. The GPS signals 56 may enable the location of the platform 30 relative to the ground surface 32 and/or an object of interest to be determined. The GPS receiver 38 may decode the GPS signals 56 and/or issue location signals 60. The location signals 60 may be dependent, at least in part, on the GPS signals 56 and may be indicative of the location of the platform 30 relative to the ground surface 32 and/or an object of interest. The location signals 60 corresponding to each image captured by the image capturing devices 34 may be received and/or stored by the image capturing and processing computer system 50 in a manner in which the location signals are associated with the corresponding image.

The INU 40 may be a conventional inertial navigation unit. The INU 40 may be coupled to and detect changes in the velocity (e.g., translational velocity, rotational velocity) of the one or more image capturing devices 34, the LIDAR scanner 36, and/or the platform 30. The INU 40 may issue velocity signals and/or data signals 62 indicative of such velocities and/or changes therein to the image capturing and processing computer system 50. The image capturing and processing computer system 50 may then store the velocity signals and/or data 62 corresponding to each image captured by the one or more image capturing devices 34 and/or data points collected by the LIDAR scanner 36.

The clock 42 may keep a precise time measurement. For example, the clock 42 may keep a precise time measurement used to synchronize events. The clock 42 may include a time data/clock signal 64. In some embodiments, the time data/clock signal 64 may include a precise time that an image is taken by the one or more image capturing devices 34 and/or the precise time that points are collected by the LIDAR scanner 36. The time data 64 may be received by and/or stored by the image capturing and processing computer system 50. In some embodiments, the clock 42 may be integral with the image capturing and processing computer system 50, such as, for example, a clock software program.

The gyroscope 44 may be conventional gyroscope commonly found on airplanes and/or within navigation systems (e.g., commercial navigation systems for airplanes). The gyroscope 44 may submit signals including a yaw signal 66, a roll signal 68, and/or a pitch signal 70. In some embodiments, the yaw signal 66, the roll signal 68, and/or the pitch signal 70 may be indicative of the yaw, roll and picture of the platform 30. The yaw signal 66, the roll signal 68, and/or the pitch signal 70 may be received and/or stored by the image capturing and processing computer system 50.

The compass 46 may be any conventional compass (e.g., conventional electronic compass) capable of indicating the heading of the platform 30. The compass 46 may issue a heading signal and/or data 72. The heading signal and/or data 72 may be indicative of the heading of the platform 30. The image capturing and processing computer system 50 may receive, store and/or provide the heading signal and/or data 72 corresponding to each image captured by the one or more image capturing devices 34.

The altimeter 48 may indicate the altitude of the platform 30. The altimeter 48 may issue an altimeter signal and/or data 74. The image capturing and processing computer system 50 may receive, store and/or provide the altimeter signal and/or data 74 corresponding to each image captured by the one or more image capturing devices 34.

Figure 4:
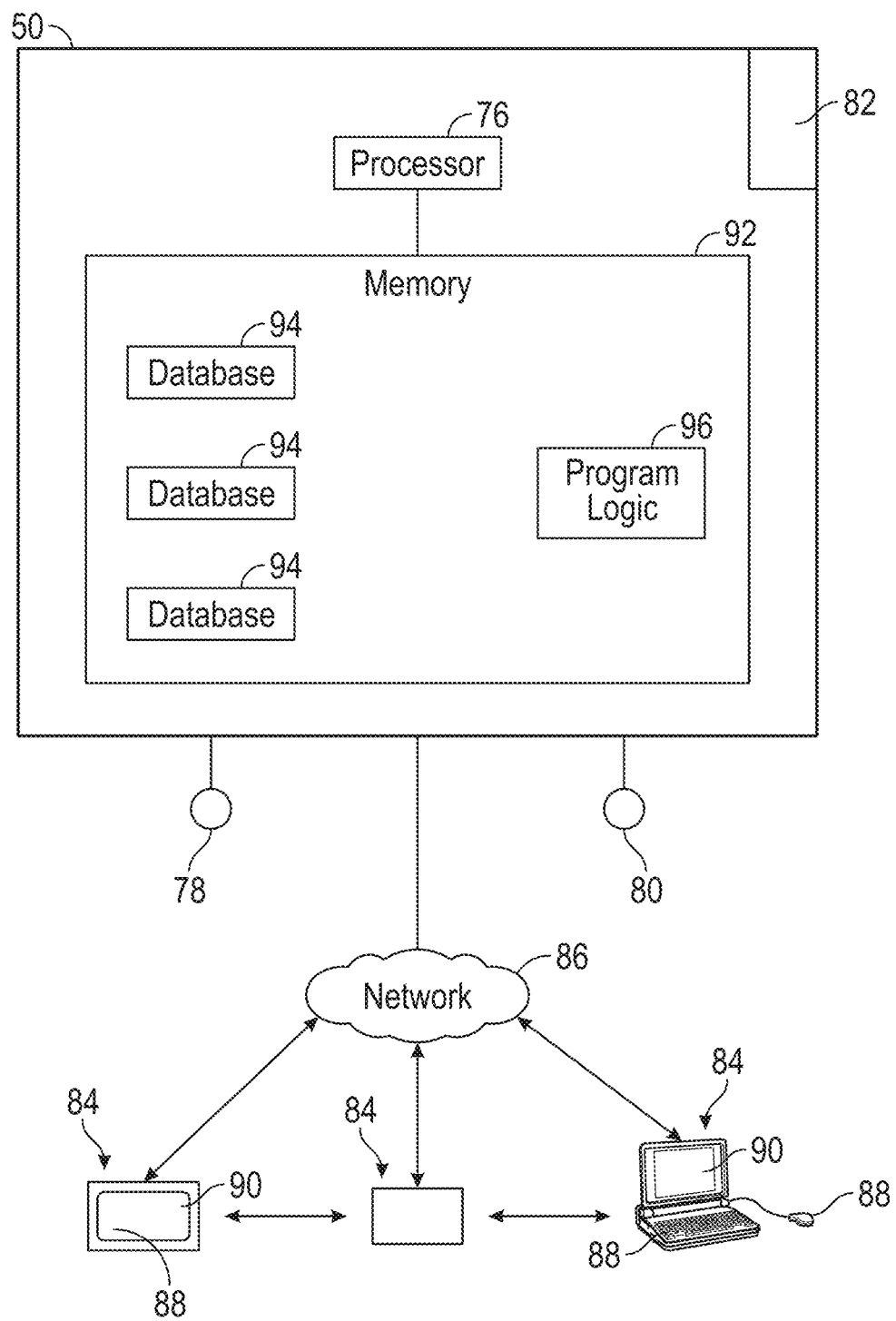
FIG. 4 illustrates a block diagram of the image-capturing computer system of FIG. 3 communicating via a network with multiple processors.

Referring to FIGS. 3 and 4, the image capturing and processing computer system 50 may be a system or systems that are able to embody and/or execute the logic of the processes described herein. Logic embodied in the form of software instructions and/or firmware may be executed on any appropriate hardware. For example, logic embodied in the form of software instructions or firmware may be executed on a dedicated system or systems, or on a personal computer system, or on a distributed processing computer system, and/or the like. In some embodiments, logic may be implemented in a stand-alone environment operating on a single computer system and/or logic may be implemented in a networked environment, such as a distributed system using multiple computers and/or processors. For example, a subsystem of the image capturing and processing computer system 50 can be located on the platform 30, and another subsystem of the image capturing and processing computer system 50 can be located in a data center having multiple computers and/or processor networked together.

In some embodiments, the image capturing and processing computer system 50 may include one or more processors 76 communicating with one or more image capturing input devices 78, image capturing output devices 80, and/or I/O ports 82 enabling the input and/or output of data to and from the image capturing and processing computer system 50.

FIG. 4 illustrates the image capturing and processing computer system 50 having a single processor 76. It should be noted, however, that the image capturing and processing computer system 50 may include multiple processors 76. In some embodiments, the processor 76 may be partially or completely network-based or cloud-based. The processor 76 may or may not be located in a single physical location. Additionally, multiple processors 76 may or may not necessarily be located in a single physical location.

The one or more image capturing input devices 78 may be capable of receiving information input from a user and/or processor(s), and transmitting such information to the processor 76. The one or more image capturing input devices 78 may include, but are not limited to, implementation as a keyboard, touchscreen, mouse, trackball, microphone, fingerprint reader, infrared port, slide-out keyboard, flip-out keyboard, cell phone, PDA, video game controller, remote control, fax machine, network interface, speech recognition, gesture recognition, eye tracking, brain-computer interface, combinations thereof, and/or the like.

The one or more image capturing output devices 80 may be capable of outputting information in a form perceivable by a user and/or processor(s). For example, the one or more image capturing output devices 80 may include, but are not limited to, implementations as a computer monitor, a screen, a touchscreen, a speaker, a website, a television set, a smart phone, a PDA, a cell phone, a fax machine, a printer, a laptop computer, an optical head-mounted display (OHMD), combinations thereof, and/or the like. It is to be understood that in some exemplary embodiments, the one or more image capturing input devices 78 and the one or more image capturing output devices 80 may be implemented as a single device, such as, for example, a touchscreen or a tablet.

Each of the data signals 52, 54, 60, 62, 64, 66, 68, 70, 72, and/or 74 may be provided to the image capturing and processing computer system 50. For example, each of the data signals 52, 54, 60, 62, 64, 66, 68, 70, 72, and/or 74 may be received by the image capturing and processing computer system 50 via the I/O port 82. The I/O port 82 may comprise one or more physical and/or virtual ports.

In some embodiments, the image capturing and processing computer system 50 may be in communication with one or more additional processors 84 as illustrated in FIG. 4. In this example, the image capturing and processing computer system 50 may communicate with the one or more additional processors 84 via a network 86. As used herein, the terms "network-based", "cloud-based", and any variations thereof, may include the provision of configurable computational resources on demand via interfacing with a computer and/or computer network, with software and/or data at least partially located on the computer and/or computer network, by pooling processing power of two or more networked processors.

In some embodiments, the network 86 may be the Internet and/or other network. For example, if the network 86 is the Internet, a primary user interface of the image capturing software and/or image manipulation software may be delivered through a series of web pages. It should be noted that the primary user interface of the image capturing software and/or image manipulation software may be replaced by another type of interface, such as, for example, a Windows-based application.

The network 86 may be almost any type of network. For example, the network 86 may interface by optical and/or electronic interfaces, and/or may use a plurality of network topographies and/or protocols including, but not limited to, Ethernet, TCP/IP, circuit switched paths, and/or combinations thereof. For example, in some embodiments, the network 86 may be implemented as the World Wide Web (or Internet), a local area network (LAN), a wide area network (WAN), a metropolitan network, a wireless network, a cellular network, a Global System for Mobile Communications (GSM) network, a code division multiple access (CDMA) network, a 3G network, a 4G network, a satellite network, a radio network, an optical network, a cable network, a public switched telephone network, an Ethernet network, combinations thereof, and/or the like. Additionally, the network 86 may use a variety of network protocols to permit bi-directional interface and/or communication of data and/or information. It is conceivable that in the near future, embodiments of the present disclosure may use more advanced networking topologies.

The image capturing and processing computer system 50 may be capable of interfacing and/or communicating with the one or more computer systems including processors 84 via the network 86. Additionally, the one or more processors 84 may be capable of communicating with each other via the network 86.

The processors 84 may include, but are not limited to implementation as a variety of different types of computer systems, such as a server system having multiple servers in a configuration suitable to provide a commercial computer based business system (such as a commercial web-site and/or data center), a personal computer, a smart phone, a network-capable television set, a television set-top box, a tablet, an e-book reader, a laptop computer, a desktop computer, a network-capable handheld device, a video game console, a server, a digital video recorder, a DVD player, a Blu-Ray player, a wearable computer, a ubiquitous computer, combinations thereof, and/or the like. In some embodiments, the computer systems comprising the processors 84 may include one or more input devices 88, one or more output devices 90, processor executable code, and/or a web browser capable of accessing a website and/or communicating information and/or data over a network, such as network 86. The computer systems comprising the one or more processors 84 may include one or more non-transient memory comprising processor executable code and/or software applications, for example. The image capturing and processing computer system 50 may be modified to communicate with any of these processors 84 and/or future developed devices capable of communicating with the image capturing and processing computer system 50 via the network 86.

The one or more input devices 88 may be capable of receiving information input from a user, processors, and/or environment, and transmit such information to the processor 84 and/or the network 86. The one or more input devices 88 may include, but are not limited to, implementation as a keyboard, touchscreen, mouse, trackball, microphone, fingerprint reader, infrared port, slide-out keyboard, flip-out keyboard, cell phone, PDA, video game controller, remote control, fax machine, network interface, speech recognition, gesture recognition, eye tracking, brain-computer interface, combinations thereof, and/or the like.

The one or more output devices 90 may be capable of outputting information in a form perceivable by a user and/or processor(s). For example, the one or more output devices 90 may include, but are not limited to, implementations as a computer monitor, a screen, a touchscreen, a speaker, a website, a television set, a smart phone, a PDA, a cell phone, a fax machine, a printer, a laptop computer, an optical head-mounted display (OHMD), combinations thereof, and/or the like. It is to be understood that in some exemplary embodiments, the one or more input devices 88 and the one or more output devices 90 may be implemented as a single device, such as, for example, a touchscreen or a tablet.

Referring to FIG. 4, in some embodiments, the image capturing and processing computer system 50 may include one or more processors 76 working together, or independently to execute processor executable code, and one or more memories 92 capable of storing processor executable code. In some embodiments, each element of the image capturing and processing computer system 50 may be partially or completely network-based or cloud-based, and may or may not be located in a single physical location.

The one or more processors 76 may be implemented as a single or plurality of processors working together, or independently, to execute the logic as described herein. Exemplary embodiments of the one or more processors 76 may include, but are not limited to, a digital signal processor (DSP), a central processing unit (CPU), a field programmable gate array (FPGA), a microprocessor, a multi-core processor, and/or combination thereof, for example. The one or more processors 76 may be capable of communicating via the network 86, illustrated in FIG. 4, by exchanging signals (e.g., analog, digital, optical, and/or the like) via one or more ports (e.g., physical or virtual ports) using a network protocol. It is to be understood, that in certain embodiments, using more than one processor 76, the processors 76 may be located remotely from one another, in the same location, or comprising a unitary multi-core processor. The one or more processors 76 may be capable of reading and/or executing processor executable code and/or capable of creating, manipulating, retrieving, altering, and/or storing data structures into one or more memories 92.

The one or more memories 92 may be capable of storing processor executable code. Additionally, the one or more memories 92 may be implemented as a conventional non-transitory memory, such as, for example, random access memory (RAM), a CD-ROM, a hard drive, a solid state drive, a flash drive, a memory card, a DVD-ROM, a floppy disk, an optical drive, combinations thereof, and/or the like, for example.

In some embodiments, the one or more memories 92 may be located in the same physical location as the image capturing and processing computer system 50. Alternatively, one or more memories 92 may be located in a different physical location as the image capturing and processing computer system 50, with the image capturing and processing computer system 50 communicating with one or more memories 92 via a network such as the network 86, for example. Additionally, one or more of the memories 92 may be implemented as a "cloud memory" (i.e., one or more memories 92 may be partially or completely based on or accessed using a network, such as network 86, for example).

Referring to FIG. 4, the one or more memories 92 may store processor executable code and/or information comprising one or more databases 94 and program logic 96 (i.e., computer executable logic). In some embodiments, the processor executable code may be stored as a data structure, such as a database and/or data table, for example. For example, one of the databases 94 can be a geospatial database storing aerial images, another one of the databases 94 can store point clouds, and another one of the databases 94 can store the internal and external orientation information for geo-referencing the images within the geospatial database.

In use, the image capturing and processing computer system 50 may execute the program logic 96 which may control the reading, manipulation, and/or storing of data signals 52, 54, 60, 62, 64, 66, 68, 70, 72, and/or 74. For example, the program logic may read data signals 52 and 54, and may store them within the one or more memories 92. Each of the signals 60, 62, 64, 66, 68, 70, 72 and 74, may represent the conditions existing at the instance that an oblique image and/or nadir image is acquired and/or captured by the one or more image capturing devices 34.

In some embodiments, the image capturing and processing computer system 50 may issue an image capturing signal to the one or more image capturing devices 34 to thereby cause those devices to acquire and/or capture an oblique image and/or a nadir image at a predetermined location and/or at a predetermined interval. In some embodiments, the image capturing and processing computer system 50 may issue the image capturing signal dependent on at least in part on the velocity of the platform 30. Additionally, the image capturing and processing computer system 50 may issue a point collection signal to the LIDAR scanner 36 to thereby cause the LIDAR scanner to collect points at a predetermined location and/or at a predetermined interval.

Program logic 96 of the image capturing and processing computer system 50 may decode, as necessary, and/or store the aforementioned signals within the memory 92, and/or associate the data signals with the image data signals 52 corresponding thereto, or the LIDAR scanner signal 54 corresponding thereto. Thus, for example, the altitude, orientation, roll, pitch, yaw, and the location of each image capturing device 34 relative to the ground surface 32 and/or object of interest for images captured may be known. More particularly, the [X, Y, Z] location (e.g., latitude, longitude, and altitude) of an object or location seen within the images or location seen in each image may be determined. Similarly, the altitude, orientation, roll, pitch, yaw, and the location of the LIDAR scanner 36 relative to the ground surface 32 and/or object of interest for collection of data points may be known. More particularly, the [X, Y, Z] location (e.g., latitude, longitude, and altitude) of a targeted object or location may be determined. In some embodiments, location data for the targeted object or location may be catalogued within one or more database for retrieval.

The platform 30 may be piloted and/or guided through an image capturing path that may pass over a particular area of the ground surface 32. The number of times the platform 30 and/or the one or more image capturing devices 34 and LIDAR scanner 36 pass over the area of interest may be dependent at least in part upon the size of the area and the amount of detail desired in the captured images.

As the platform 30 passes over an area of interest, a number of images (e.g., oblique images, nadir images) may be captured by the one or more image capturing devices 34 and data points may be captured by the LIDAR scanner 36 (optional). In some embodiments, the images may be captured and/or acquired by the one or more image capturing devices 34 at predetermined image capture intervals that may be dependent, at least in part, upon the velocity of the platform 30. For example, the safe flying height for a fixed wing aircraft may be a minimum clearance of 2,000' above the ground surface 32, and may have a general forward flying speed of 120 knots. In this example, oblique image-capturing devices may capture 1 cm to 2 cm ground sample distance imagery, and vertical image-capturing devices may be capable of capturing 2 cm to 4 cm ground sample distance imagery.

The image data signals 52 corresponding to each image acquired and the data point via the LIDAR scanner 36 may be received by and/or stored within the one or more memories 92 of the image capturing and processing computer system 50 via the I/O port 82. Similarly, the signals 60, 62, 64, 66, 68, 70, 72 and 74 corresponding to each captured image may be received and stored within the one or more memories 92 of the image capturing and processing computer system 50 via the I/O port 82. The LIDAR scanner signals 54 may be received and stored as LIDAR 3D point clouds.

Thus, the location of the one or more image capturing devices 34 relative to the ground surface 32 at the precise moment each image is captured is recorded within the one or more memories 92 and associated with the corresponding captured oblique and/or nadir image. Additionally, location data associated with one or more object of interest may be catalogued and stored within one or more database.

The processor 76 may create and/or store in the one or more memories 92, one or more output image and data files. For example, the processor 76 may convert image data signals 52, signals 60, 62, 64, 66, 68, 70, 72 and 74, and LIDAR scanner signals 54 into computer-readable output image, data files, and LIDAR 3D point cloud files. The output image, data files, and LIDAR 3D point cloud files may include a plurality of captured image files corresponding to captured oblique and/or nadir images, positional data, and/or LIDAR 3D point clouds corresponding thereto. Additionally, data associated with the one or more object of interest and/or images may be catalogued and saved within one or more database. For example, location information and/or metadata may be catalogued and saved within one or more database.

Output image, data files, and LIDAR 3D point cloud files may then be further provided, displayed and/or used for obtaining measurements of and between objects depicted within the captured images, including measurements of variable distribution. In some embodiments, the image capturing and processing computer system 50 may be used to provide, display and/or obtain measurements of and between objects depicted within the captured images. Alternatively, the image capturing and processing computer system 50 may deliver the output image, data files, and/or LIDAR 3D point clouds to one or more processors, such as, for example, the processors 84 illustrated in FIG. 4 for processors 84 to provide, display and/or obtain measurement.

In some embodiments, delivery of the output image, data files, and/or LIDAR 3D point cloud files may also be by physical removal of the files from the image capturing and processing computer system 50. For example, the output image, data files, and/or LIDAR 3D point cloud files may be stored on a removable storage device and transported to one or more processors 84. In some embodiments, the image capturing and processing computer system 50 may provide at least a portion of the display and/or determine at least a portion of the measurements further described herein.

For simplicity, the following description for measurement of objects of interest as described herein includes reference to residential housing wherein the roof is the object of interest; however, it should be understood by one skilled in the art that the methods described herein may be applied to any structure and/or object of interest. For example, the methods may be applied to any man-made and/or natural object (e.g., commercial building structure, tree, driveway, road, bridge, concrete, water, turf and/or the like).

FIGS. 5-9 illustrate exemplary images that are annotated to explain how embodiments of the present disclosure automatically locate objects of interest and automatically generate building outlines reports about the objects of interest that can be used for a variety of purposes including automated building reports, change detection by comparing building outlines generated from imagery of the same building but captured at different times, and steering of mosaic cutlines through portions of the imagery that do not contain a building outline.

Figure 5:
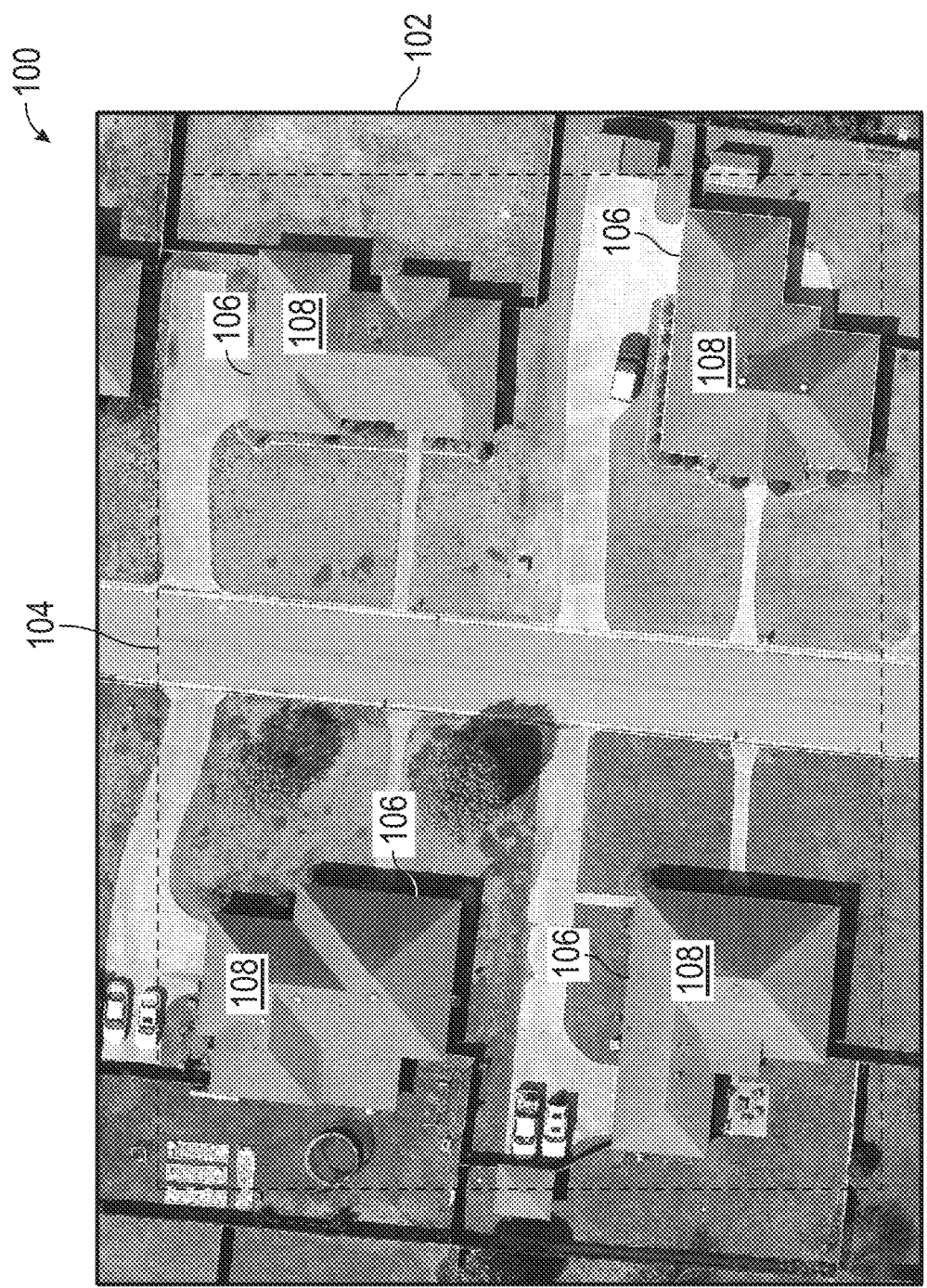
FIG. 5 illustrates a screen shot of an image of a region having multiple objects of interest in accordance with the present disclosure.

Referring to FIG. 5, illustrated therein is a screen shot 100 of an image 102 of a region 104 having multiple buildings 106. In this example, the region 104 includes one or more objects of interest with each building 106 being an object of interest. Roofs 108 of each building are features of the objects of interest. It should be noted that the object(s) of interest and/or feature(s) of the object(s) of interest may be any natural and/or man-made objects within the image. For simplicity of description, buildings 106, as the objects of interest, and roofs 108, as the features of the objects of interest, will be used in the following description. It should be noted, however, that any object of interest within an image may be used including man-made or non-man-made objects (e.g., natural objects). Further, objects of interest absent within an image may also be determined using systems and methods described herein. For example, alterations in a footprint of trees may be determined (i.e., loss of trees) using systems and methods described herein.

Figure 6:
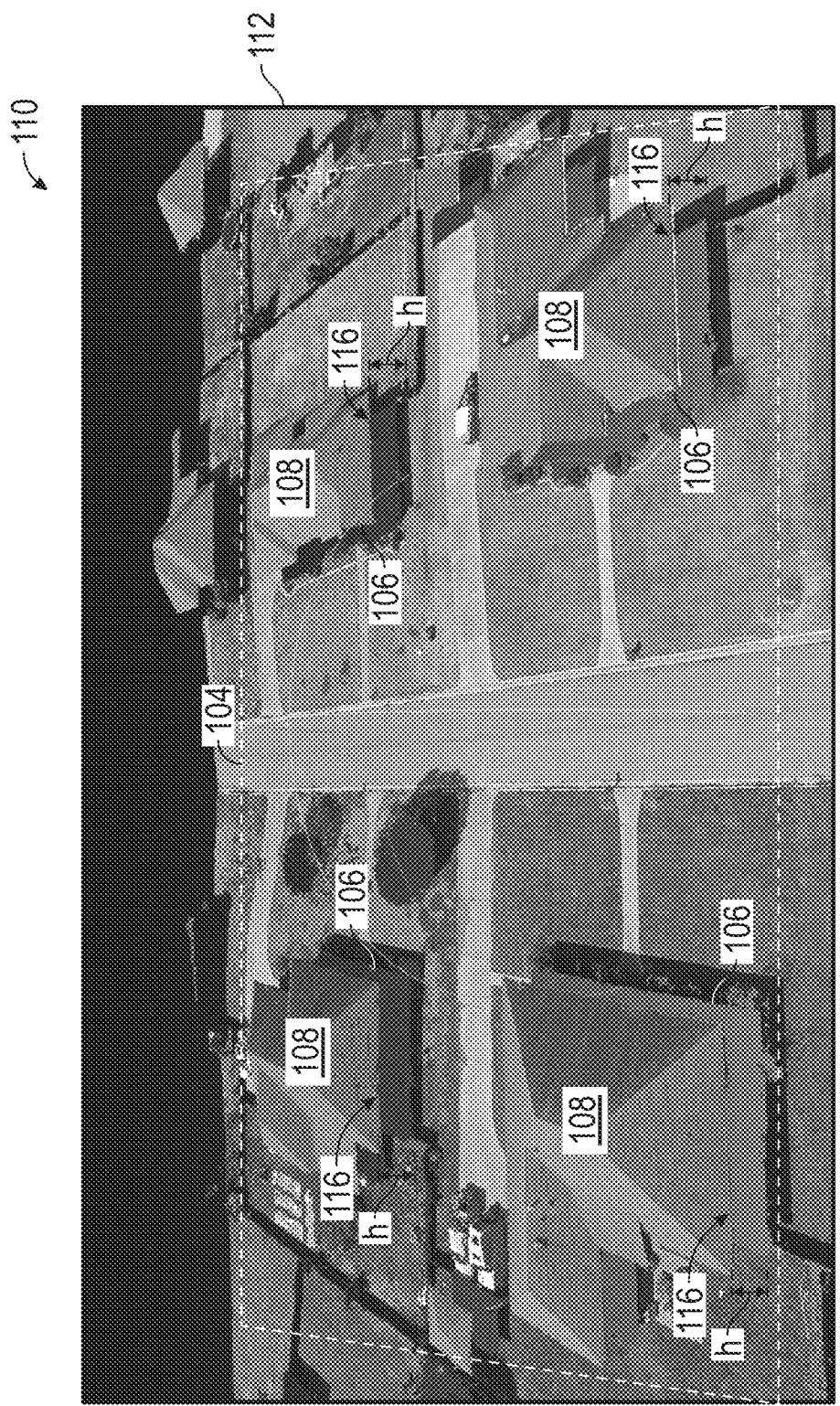
FIG. 6 illustrates a screen shot of a point cloud of the region illustrated in FIG. 5.

Generally, the output image file and data files may be used to geo-reference the collected images. Exemplary methods for geo-referencing the imagery may be found in at least U.S. Pat. Nos. 7,424,133 and 5,247,356, which are hereby incorporated by reference in their entirety. Geo-referencing each image results in information that can be used with predetermined algorithms, such as a single-ray projection algorithm, to determine three dimensional geographical coordinates for points in each image. Using the internal and external orientation information also permits the real-world three-dimensional position of pixels to be determined using multiple images and stereophotogrammetry techniques. Referring to FIGS. 1, 5 and 6, a point cloud may be generated as discussed above using geo-referenced images and/or LIDAR data points.

FIG. 6 illustrates a screen shot 110 of a point cloud 112 of the region 104 having the building 106. In some embodiments, the point cloud 112 may be generated by extracting points with determined geographical coordinates using two or more images and geo-referenced data obtained from the image capturing and processing computer system 50. Using a known or calculated distance between capture locations of the one or more image capturing devices 34 and stereo photogrammetry using multiple images, three dimensional points having three dimensional distances from the one or more image capturing devices 34 may be determined. In some embodiments, stereo analysis using standard stereo pair photogrammetry techniques may be automated. In each image, a geographical coordinate, such as (x, y, z) may correspond to a data point in the point cloud 112. As such, each data point has a three-dimensional coordinate.

In some embodiments, the LIDAR 3D data point files may be processed and geo-referenced providing the point cloud 112. For example, the LIDAR 3D data point files may be processed and geo-referenced using software such as Reigl's RiProcess application, distributed by Reigl located in Horn, Austria. In some embodiments, images and georeferenced data, in addition to LIDAR data point files, may be used to generate the point cloud. In some embodiments, images and georeferenced data, in lieu of LIDAR data point files, may be used to generate the point cloud 112.

Figure 7:
FIG. 7 illustrates a screen shot of a modified point cloud having data points at an elevation of interest.

Referring to FIGS. 1, 6 and 7, in three-dimensional space, natural and man-made structures may be above ground (i.e., ground surface 32 illustrated in FIG. 2). The point cloud 112 may be analyzed to identify data points within the point cloud 112 at particular elevations above ground and/or classify data points within the point cloud at particular elevations. In one example, the point cloud 112 may be analyzed to identify and classify ground structures 114 and/or non-ground structures (i.e., those structures above the ground including man-made objects and natural objects). In some embodiments, areas within the point cloud 112 indicative of the ground structures 114 may be classified as the ground structure 114 and/or removed such that further analysis can be directed to natural and/or man-made structures depicted in the point cloud 112 above the ground structure 114.

Even further, data points at particular elevations may be isolated, classified and/or removed from the point cloud 112.

For example, data points within the point cloud 112 not associated with structures at an elevation of interest 116 may be removed such that only data points of structures at the elevation of interest 116 remain within a modified point cloud 118. For example, FIG. 7 illustrates a screen shot 120 of the modified point cloud 118 wherein data points at the elevation of interest 116 (i.e., height h) were identified from the point cloud 112. Even further, data points not associated with structures at the elevation of interest 116 shown in FIG. 6 were classified as not being associated with structures, and then optionally removed from the point cloud 112 to obtain the modified point cloud 118 shown in FIG. 7.

In some embodiments, the elevation of interest 116 may be an average or estimated elevation. For example, FIG. 7 illustrates a screen shot 120 of a modified point cloud 118 showing data points at the elevation of interest 116 of an estimated height h of a roof from ground level shown in FIG. 6. In some embodiments, the elevation of interest 116 may be determined by analysis of the elevation gradient of the data points.

Referring to FIGS. 1, 6 and 7, an object of interest may be detected using the point cloud and the elevation gradient. For example, the object of interest may be the building 106. In one example, the remaining data points at the elevation of interest 116 may be used to classify structures in the modified point cloud 118 as man-made structures 122 or natural structures 124 with each data point having a unique three dimensional point (x, y, z) within the modified point cloud 118. In particular, spatial relationships between each data point may be analyzed to classify such structures as man-made structures 122 (i.e., caused by humankind) or natural structures 124 (i.e., not made or caused by humankind). In one example, the variation of surface normal direction between each point of a group of points and the other points may be analyzed to differentiate man-made structures 122 and natural structures 124. This analysis can be implemented by analyzing a group of points within a local area surrounding particular points within the modified point cloud 118 to determine an orientation of a plane fitting the group of points and assigning this value(s) to the particular point. This process can be repeated for either all of the points in the modified point cloud 118 that have been classified as either a man-made structure or a natural structure or a subset of the points. The local area can be a matrix of pixels that is a subset of the modified point cloud. The size of the matrix can be varied. The matrix has a number of pixels that can be within a range of 0.1% to about 10% of the number of pixels within the modified point cloud 118. For example, the local area can be a 25×25 pixel matrix or the like. Once the orientations have been calculated, then the adjacent orientations are compared to determine a local variation of the surface normal direction. If the data points represent a man-made structure, then the local variation of surface normal direction should be smaller than if the data points represent a natural structure, such as a tree or bush. In some embodiments, data points in which local variation exceeds a pre-determined amount (e.g., 10-20 degrees, and more particularly 15 degrees) may be classified as the natural structure 124. Data points having variation that is below the pre-determined amount may be classified as a man-made structure 122. Each of the data points within the modified point cloud may be analyzed and data points positioned at or above the elevation of interest 116 may be classified as natural structures 124 or man-made structures 122 rather than the ground structure 114.

Figure 8:
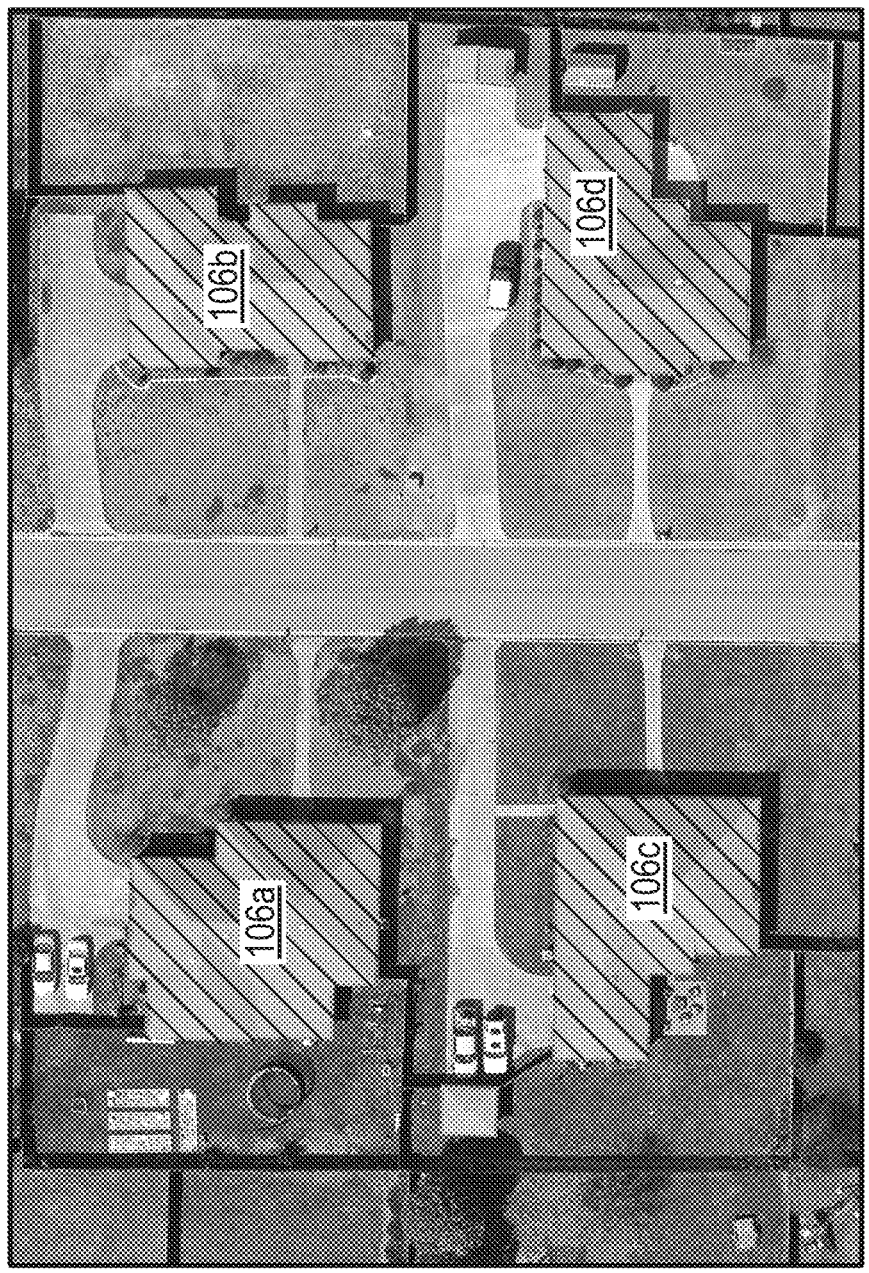
FIG. 8 illustrates a screen shot of buildings identified using data points of a point cloud in accordance with the present disclosure.

Referring to FIGS. 7 and 8, each of the data points at the elevation of interest 116 and classified as a part of a man-made structure 122 may be further identified as part of an identifiable structure within an image. For example, groupings of data points within Region A classified as part of man-made structures 122 may be further classified as building 106a; groupings of data points within Region B classified as part of man-made structures 122 may be further classified as building 106b; groupings of data points within Region C classified as part of man-made structures 122 may be further classified as buildings 106c and 106e; and, groupings of data points within Region D classified as part of man-made structures 122 may be further classified as buildings 106d and 106f. Groupings of data points can be classified as particular buildings by detecting building outlines. Once the building outlines are detected, data points within the building outline are classified as part of the building.

Figure 9:
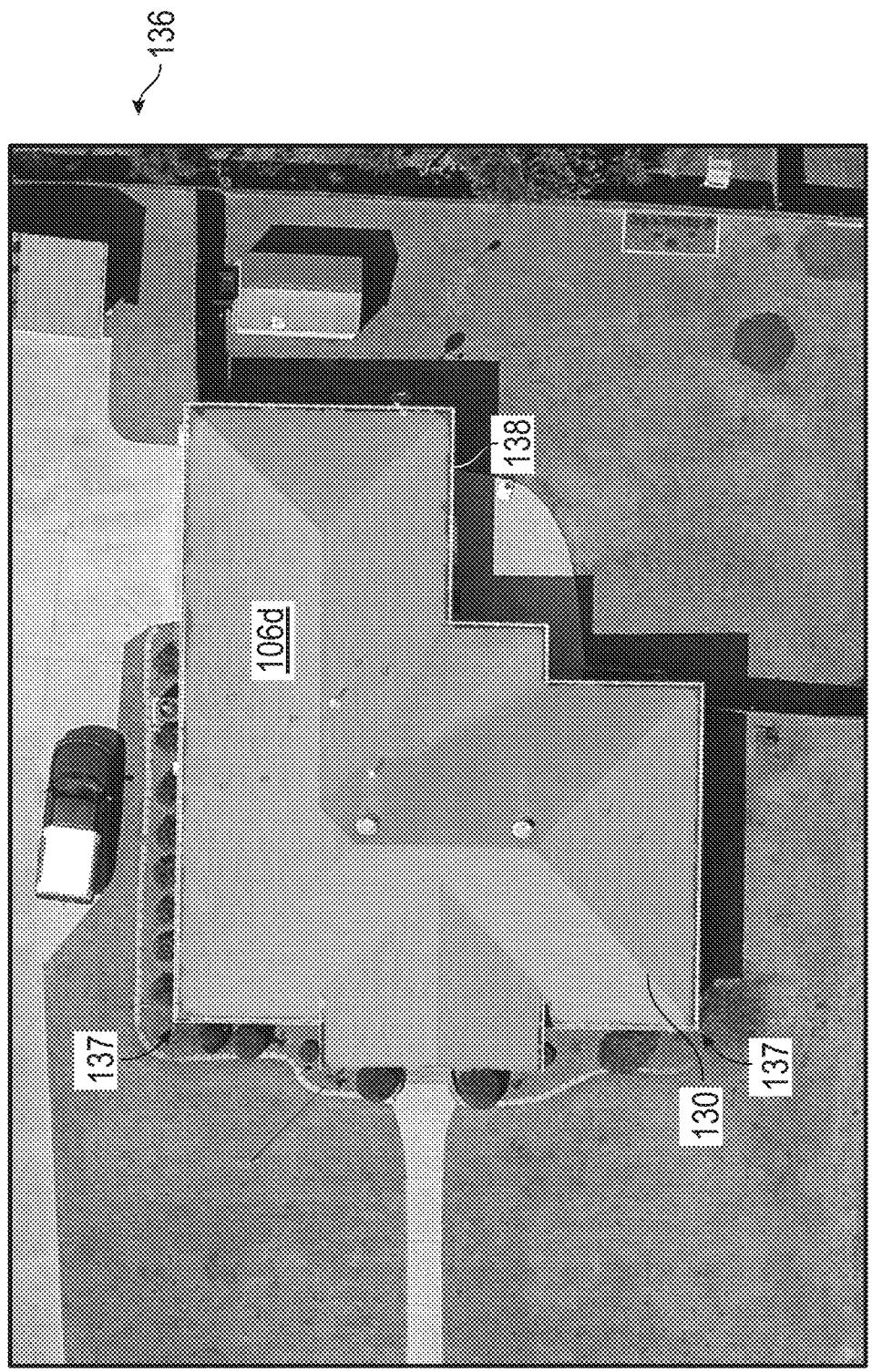
FIG. 9 illustrates a screen shot of an image showing boundaries on a building identified using the modified point cloud of FIG. 7.

Once groupings within the point cloud 112 or the modified point cloud 118 have been identified, then the outer most boundaries are identified to determine a rough outline of the object. The rough outline of the object can be refined by correlating the locations of the data points in the point cloud 112 or the modified point cloud 118 with images from one or more of the databases 94, and then analyzing the raster content within one or more images showing the object to more precisely locate the outline of the object. For example, FIG. 9 illustrates a screen shot 136 of building 106d. In some embodiments, edges of the building 106d may be detected within the images using any standard edge detection algorithm. Standard edge detection algorithms may include, but are not limited to, a Laplacian filter, and/or the like.

In some embodiments, spectral analysis of the raster content can be used to identify whether data points within the modified point cloud 118 are likely identifying an object of interest (e.g., buildings 106). For example, the automated roof detection system described in U.S. Pat. No. 9,070,018, which is hereby incorporated by reference in its entirety, may be used to identify the objects of interest within images. Although the automated roof detection system is described in relation to detection of roofs, it should be noted that such system may apply to identification of any object of interest (e.g., man-made or natural structures). Generally, the automated object detection system may use statistical analysis to analyze sections of the images that depict the object of interest, as previously determined within the modified point cloud 118. The automated object detection system may further refine the boundary of the buildings 106 and/or roof 130. Statistical measures may be computed for sections of each image.

Figure 10:
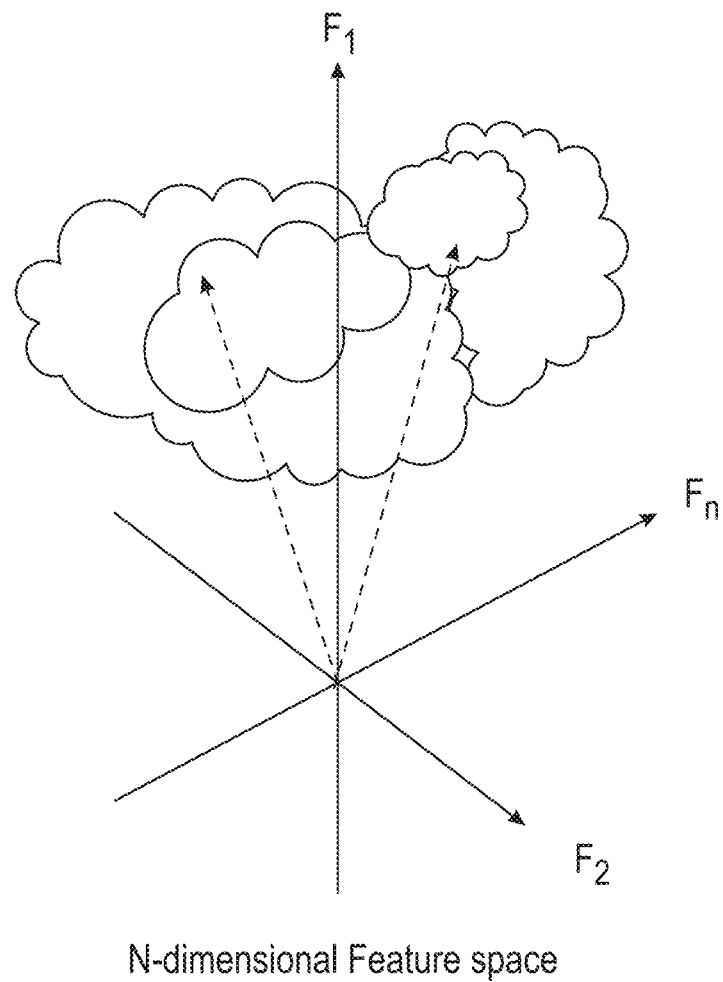
FIGS. 10-12 illustrate an exemplary method for automated object detection in accordance with the present disclosure.
Figure 11:
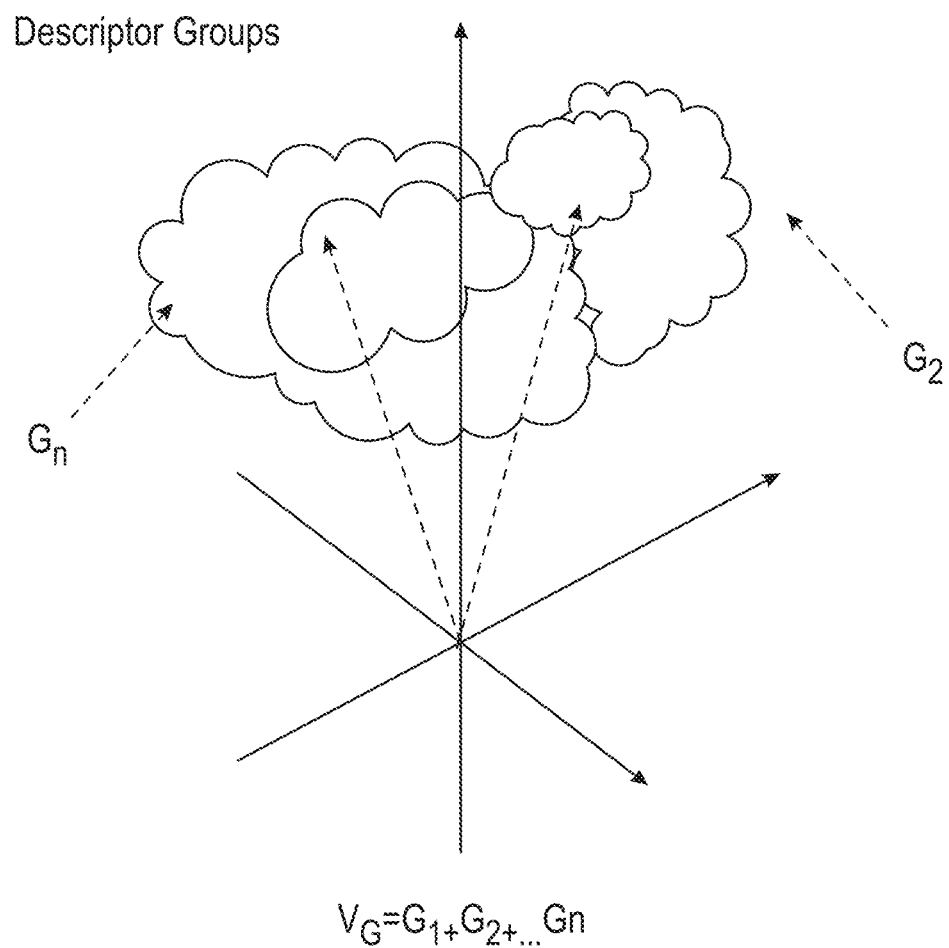
Figure 12:
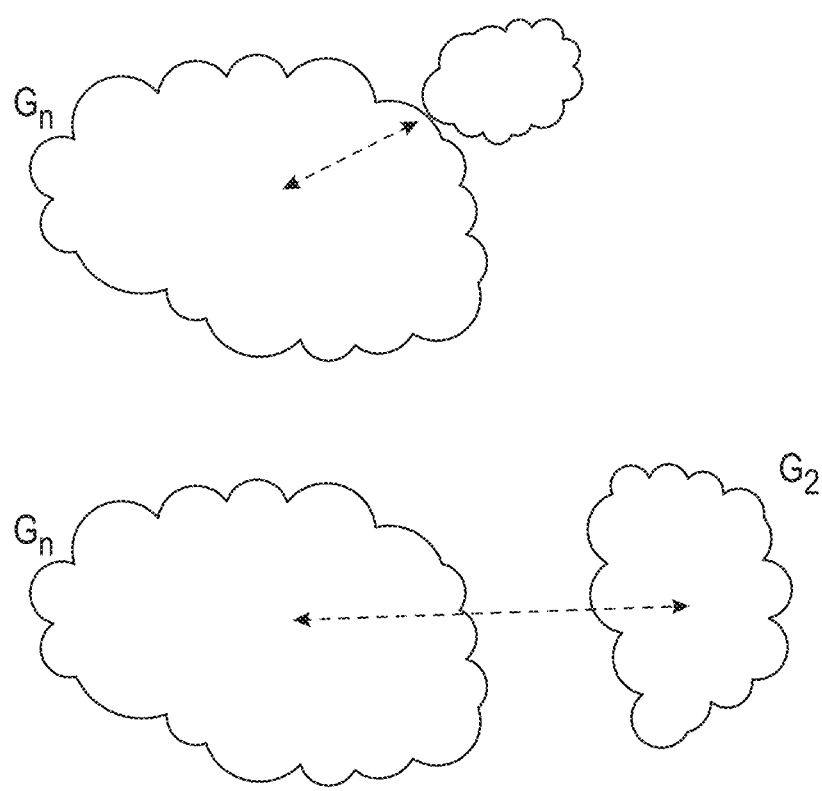

FIGS. 10-12 illustrate an exemplary process for determining group descriptor patterns used to identify objects of interest within an image for automated object classification. The rough outline of the object can be refined by correlating the locations of the data points in the point cloud 112 or the modified point cloud 118 with images from one or more of the databases 94, and then analyzing the raster content within one or more images showing the object to more precisely locate the outline of the object.

Referring to FIG. 10, the value of each pixel within the image is part of a vector comprising the values determined for each of the measures calculated for that pixel within an n-dimensional feature space as shown in FIG. 10.

Referring to FIG. 11, a feature transformation may be performed, wherein image measures are statistically analyzed using clustering techniques to group data into separable descriptor groups (i.e., clusters). Image measures may include, for example, localized measures and neighborhood measures. Localized measures describe data points at a particular processing point. Example localized measures may include, but are not limited to, surface fractal analysis, topological contour complexity variation, and/or the like. Neighborhood measures may include ranging related neighborhood measures that describe the organization of structure surrounding a particular processing point. Exemplary neighborhood measures may include, but are not limited to, radial complexity, radial organization variation, and/or the like. It should be noted that the number of descriptor groups may not necessarily be the same as the number of measures.

Descriptor groups (i.e., clusters) may form a new feature vector that includes any error and/or uncertainty (e.g., integrity of the point cloud) of the measurements folded into a space describing the average statistical value of a structure or feature of a structure (e.g., building 106, roof).

Referring to FIG. 12, each descriptor group may be compared to one or more descriptor groups using a statistical model to create a descriptor pattern of inter-relational characteristics. For example, each descriptor group (i.e., cluster) may be compared to other descriptor groups using a statistical model such as an associative neural network. The group descriptor patterns may serve as the basis for identifying and/or classifying objects of interest and/or features of interest within the modified point cloud 118.

An average group descriptor pattern may be generated and cross correlated using an associated neural network, creating a single pattern template (e.g., a homogenous pattern) that may be used to determine which regions of the image are likely building 106 and/or roof 130. The trained neural networks may then use the pattern template to discriminate between the building 106 and/or roof 130 and other surrounding environment. For example, the trained neural networks may use the homogenous pattern template to discriminate between roof 130 and non-roof areas. Based on these indications, second information, e.g., a boundary 138 (e.g., outline) may be determined for the building 106 (or roof 130) as shown in FIG. 9.

Figure 13:
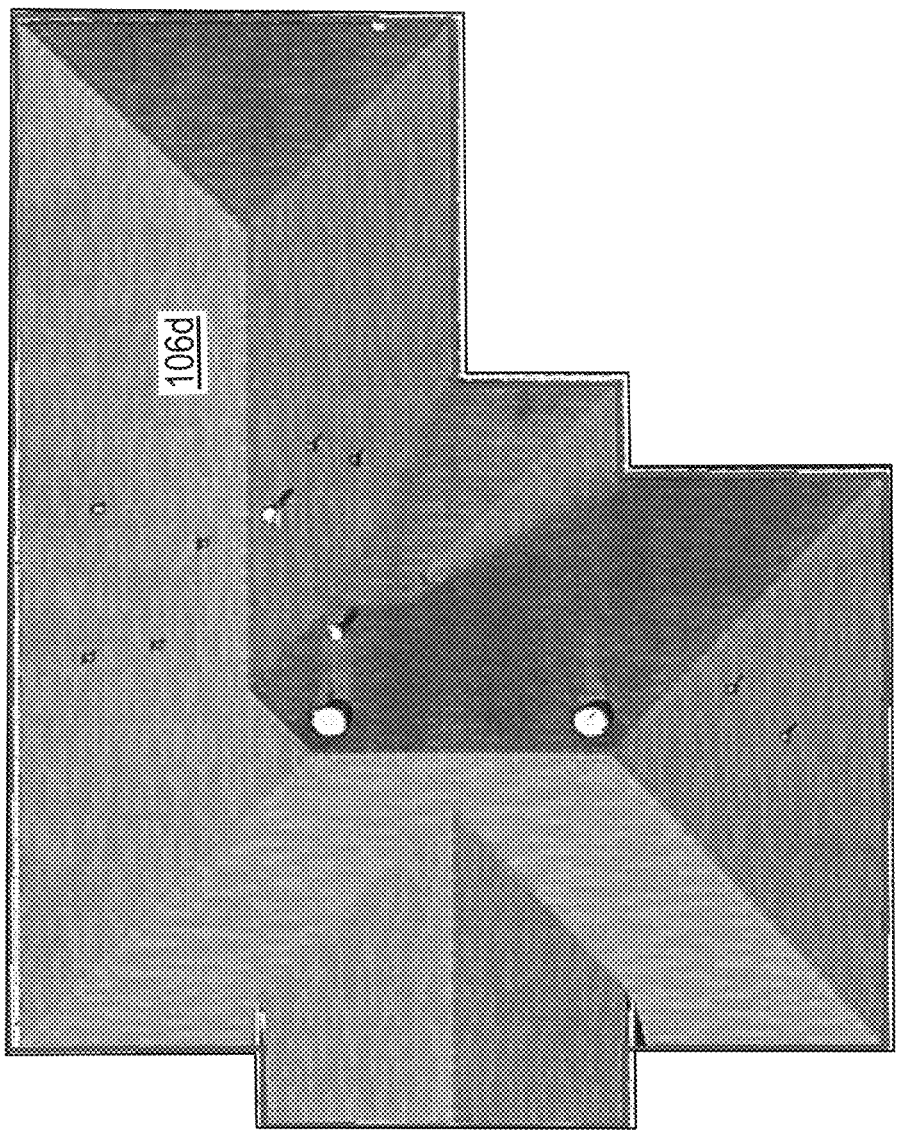
FIG. 13 illustrates the building of FIG. 9 extracted from the image.

Once the boundary 138 is determined, locations within the raster content may be converted to vector form. In one example, the trained neural networks may distinguish between roof 130 and non-roof areas giving an estimated boundary for the roof 130. Such boundary may be defined in raster format. To convert the raster format into vector format, building corners 137 may be identified in the raster format and used to convert each line segment of the boundary 138 into vector form. Once in vector form, the boundary 138 may be stored in one of the databases 94 (shown in FIG. 4) and/or further analyzed. In some embodiments, the raster content may further be geo-referenced to real-world locations. For example, the building 106 may be identified by Latitude/Longitude. In some embodiments, using the boundary 138, the building 106 may be extracted from the image as shown in FIG. 13. Such information may be stored as individual files for each building (e.g., .shp file) in the database 94, or may be stored as multiple files within the database 94.

Figure 14:
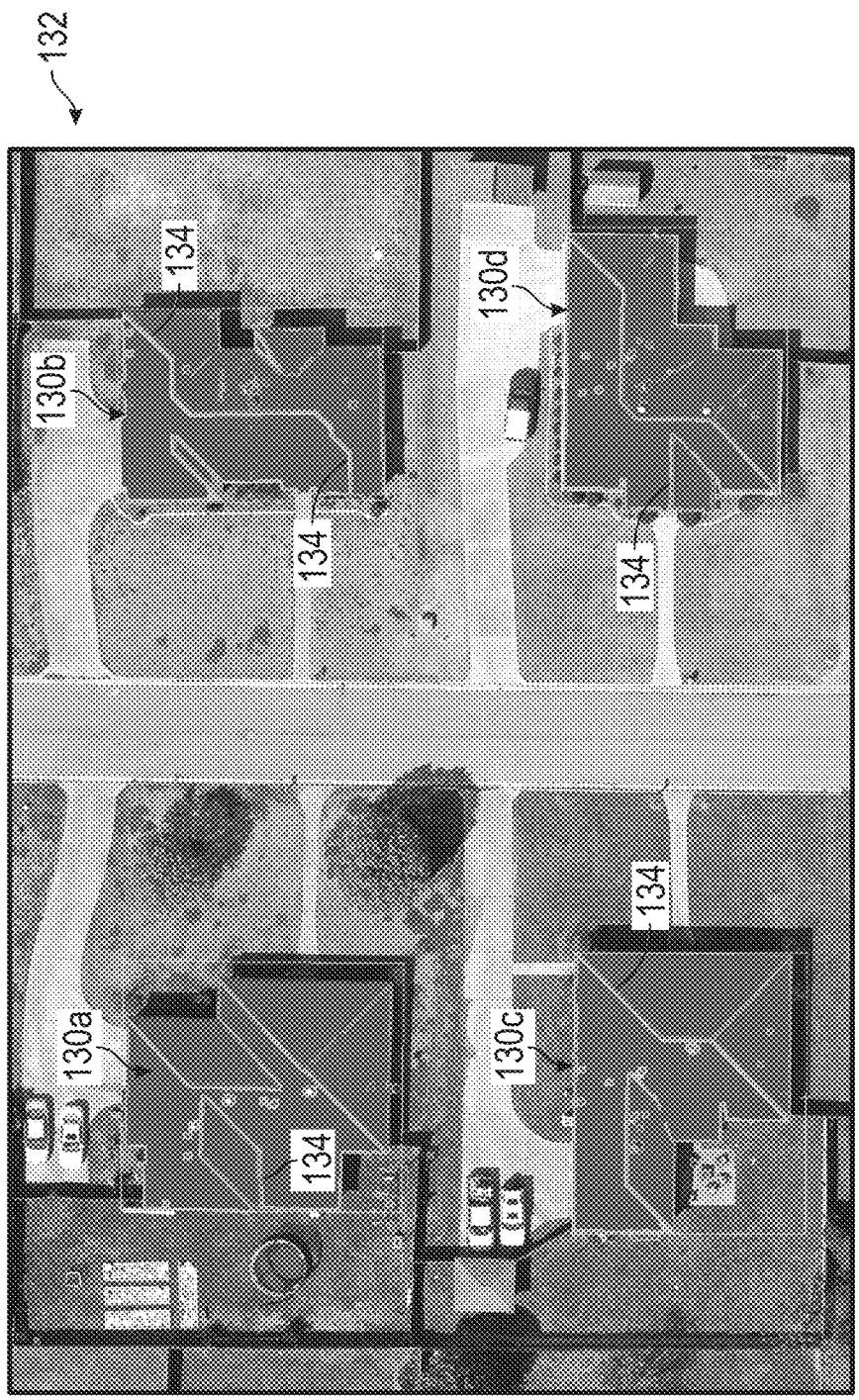
FIG. 14 illustrates a screen shot of roof features identified in accordance with the present disclosure.

Referring to FIGS. 7, 8 and 14, once an object of interest is identified within the modified point cloud 118, features of interest (e.g., roofs 130a-130d, roof elements) within an image may be identified on the objects of interest (e.g., building 106a-106d) via the modified point cloud 118, the point cloud 112, or the original image(s). In some embodiments, identification of features of interest (e.g., roofs 130) may be through the automated object detection system as described herein and in U.S. Pat. No. 9,070,018. In some embodiments, identification of features of interest may be identified via the original image subsequent to the automated classification of the object of interest via methods and systems as described, for example, U.S. Pat. Nos. 8,977,520 and 7,424,133, which are both hereby incorporated by reference in their entirety.

In some embodiments, elements within the feature of interest (e.g., roof 130) may be further classified. For example, FIG. 14 illustrates a screen shot 132 of roofs 130a-130d. Line segments 134 forming the roof may be further classified using predefined roof elements including, but not limited to, a rake, a hip, a valley, an eave, a ridge, and/or the like.

In some embodiments, one or more features of interest may be further analyzed and/or measurements determined. For example, features of the roof 130, dimensions of the roof 130, and/or roof pitch may be determined using data points within the point cloud 112, the modified point cloud 118 and/or the one or more images. For example, roof pitch may be calculated using data points of the point cloud 112 as each data point coordinates with a geographical reference (x, y, z). Using data points of the point cloud 112 located at an elevation at the top of a peak and data points located at an elevation at the bottom of a peak, roof pitch may be calculated. Roof feature calculations may include, but are not limited to, dimensions of eaves, edges, ridge, angles, and/or the like. Characteristics of the roof 130 such as features of the roof 130, dimensions of the roof 13, roof pitch, condition and/or composition of the roof 130 may be determined by analyzing the one or more images. For example, if the one more images were obtained from a manned aerial vehicle and included multi-spectral or hyper spectral information, then condition or composition of the roof 130 may also be determined. The capture platform may also be a drone, and in this instance the resolution of the one or more images may be sufficient to determine the condition (e.g., moss, excessive moisture, hail damage, etc.) or composition (tile, composition, wood, slate, etc.) of the roof 130.

In one example, boundaries may be used to identify changes to man-made and/or natural objects within an image. For example, boundaries 138 (as shown in FIG. 9) may be used to identify changes to buildings 106 and/or roof 130 over time. In some embodiments, boundaries and/or extraction techniques may be used in forming one or more mosaic models of the object of interest. For example, boundaries 138 and/or extraction techniques as described herein may be used in forming a mosaic model of the building 106. Images illustrating each side of the building 106 may be extracted using the methods as described herein. Such images may be composed into a three-dimensional mosaic model illustrating the building 106. In another example, boundaries and/or analysis of the features within the boundaries may be analyzed and/or described within a report.

Figure 15:
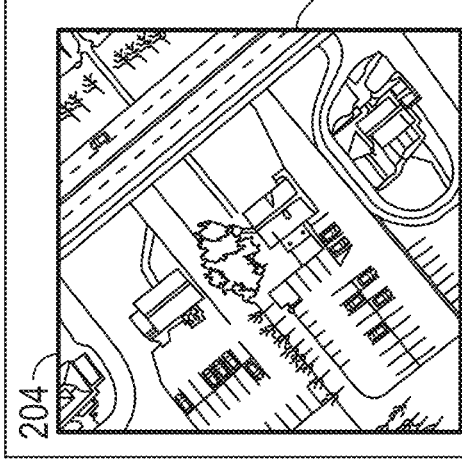
FIG. 15 illustrates an exemplary roof report generated in accordance with the present disclosure.

Referring to FIGS. 1, 4 and 15, a customer and/or contractor may receive a report regarding evaluation of object(s) of interest and/or feature(s) of interest. For example, the customer and/or contractor may receive a report regarding evaluation of the building 106 and/or roof 130. FIG. 15 illustrates an exemplary embodiment of a roof report 140. The program logic 96 may provide for one or more of the processors 84 interfacing with the image capturing and processing computer system 50 over the network 86 to provide one or more roof reports 140.

Generally, the roof report 140 may include, but is not limited to, one or more data sets 142 regarding roof pitch, total area, eave length, hip ridge length, valley length, number of box vents, and/or the like. Additionally, the roof report 140 may include one or more images 144 of the building 106 and/or roof 130. Such images 144 may be automatically provided to the roof report 140 via extraction of the building 106 and/or roof 130 as described herein. Additionally, the roof report 140 may include a customer information data set 146 (e.g., customer name and contact information), estimated area detail, contractor data set 148 (e.g., contractor name and contract information), and/or the like.

In some embodiments, determination, analysis and measurements of data associated with the object of interest and/or features of interest may be catalogued and stored in one or more database for retrieval. Data cataloged and stored associated with the object of interest and/or feature of interest may include, but is not limited to, location data (e.g., object of interest, each point of the object of interest), date and/or time of image creation, algorithms used, measurements, metadata, footprint, and/or the like. For example, boundaries associated with the object of interest and/or feature of interest may be spatially catalogued using location (e.g., coordinate data, address).

From the above description, it is clear that the inventive concepts disclosed and claimed herein are well adapted to carry out the objects and to attain the advantages mentioned herein, as well as those inherent in the invention. While exemplary embodiments of the inventive concepts have been described for purposes of this disclosure, it will be understood that numerous changes may be made which will readily suggest themselves to those skilled in the art and which are accomplished within the spirit of the inventive concepts disclosed and claimed herein.

What is claimed is:

1. An automated computerized system, comprising:
   a computer system executing image display and analysis software reading:
      at least one image having corresponding location data indicative of position and orientation of an image capturing device used to capture the image, the image depicting an object of interest; and,
      at least one database storing data points of a point cloud of the object of interest; and
   wherein the image display and analysis software executed by the computer system determines and isolates the object of interest within the point cloud forming a modified point cloud having one or more data points with first location coordinates of the object of interest; generates a boundary outline having second location coordinates of the object of interest using spectral analysis of at least one section of the at least one image identified with the first location coordinates; identifies, catalogues, and stores characteristics of the object of interest within the at least one database; and generates an inventory report compiling stored characteristics of the object of interest.

2. The automated computer system of claim 1, wherein the image display and analysis software determines and classifies the object of interest as a man-made structure.

3. The automated computer system of claim 1, wherein the image display and analysis software determines and classifies the object of interest as a non-man-made structure.

4. The automated computer system of claim 1, wherein the image display and analysis software spatially catalogues and stores the object of interest within the at least one database.

5. The automated computer system of claim 1, wherein at least one characteristic is color.

6. An automated method performed by at least one processor running computer executable instructions stored on at least one non-transitory computer readable medium, comprising:
   determining and isolating an object of interest within a point cloud;
   forming a modified point cloud having one or more data points with first location coordinates of the object of interest;
   generating a boundary outline having second location coordinates of the object of interest using spectral analysis of at least one section of at least one image identified with the first location coordinates and depicting the object of interests;
   identifying, cataloguing, and storing characteristics of the object of interest within at least one database; and
   generating an inventory report compiling stored characteristics of the object of interest.

7. The automated method of claim 6, further comprising classifying the object of interest as a man-made structure.

8. The automated method of claim 6, further comprising classifying the object of interest as a non-man-made structure.

9. The automated method of claim 6, further comprising spatially cataloguing and storing the object of interest within at least one database.

10. The automated method of claim 6, wherein at least one characteristic is color.

11. One or more non-transitory computer readable medium storing a set of computer executable instructions for running on one or more computer systems that when executed cause the one or more computer systems to:
    determine and isolate an object of interest within a point cloud;
    form a modified point cloud having one or more data points with first location coordinates of the object of interest;
    generate a boundary outline having second location coordinates of the object of interest using spectral analysis of at least one section of at least one image identified with the first location coordinates and depicting the object of interests;
    identify, catalogue, and store characteristics of the object of interest within at least one database; and
    generate an inventory report compiling stored characteristics of the object of interest.

12. The one or more non-transitory computer readable medium storing the set of computer executable instructions for running on one or more computer systems of claim 11, that when executed cause the one or more computer systems to determine and classify the object of interest as a man-made structure.

13. The one or more non-transitory computer readable medium storing the set of computer executable instructions for running on one or more computer systems of claim 11, that when executed cause the one or more computer systems to determine and classify the object of interest as a non-man-made structure.

14. The one or more non-transitory computer readable medium storing the set of computer executable instructions for running on one or more computer systems of claim 11, that when executed cause the one or more computer systems to spatially catalogue and store the object of interest within at least one database.

15. The one or more non-transitory computer readable medium storing the set of computer executable instructions for running on one or more computer systems of claim 11, wherein at least one characteristic is color.

* * * * *